(12) United States Patent
Kawai

(10) Patent No.: US 9,007,643 B2
(45) Date of Patent: Apr. 14, 2015

(54) COMMUNICATION APPARATUS

(71) Applicant: Sunao Kawai, Nagoya (JP)

(72) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/207,937

(22) Filed: Mar. 13, 2014

(65) Prior Publication Data

US 2014/0268233 A1  Sep. 18, 2014

(30) Foreign Application Priority Data

Mar. 15, 2013 (JP) ................... 2013-053803

(51) Int. Cl.
*G06F 3/12* (2006.01)

(52) U.S. Cl.
CPC .................... *G06F 3/1293* (2013.01)

(58) Field of Classification Search
USPC ............... 358/1.13, 1.15; 399/50, 70, 75
See application file for complete search history.

(56) References Cited

U.S. PATENT DOCUMENTS

| 5,800,081 A | 9/1998 | Teradaira et al. | |
| 2010/0020355 A1* | 1/2010 | Imai | 358/1.15 |
| 2010/0138396 A1* | 6/2010 | Kikkawa | 707/674 |
| 2011/0026079 A1* | 2/2011 | Nakagawa | 358/1.15 |
| 2011/0043854 A1* | 2/2011 | Sakikawa | 358/1.15 |

FOREIGN PATENT DOCUMENTS

| JP | H07-137358 A | 5/1995 |
| JP | H10-222318 A | 8/1998 |

* cited by examiner

*Primary Examiner* — Allen H Nguyen
(74) *Attorney, Agent, or Firm* — Banner & Witcoff, Ltd.

(57) ABSTRACT

A communication apparatus includes: a processor; and a memory storing computer readable instructions causing the communication apparatus to: store a condition information in the at least one memory, the condition information representing a condition to transmit data and including a data identification information, and time information representing a target time; perform a determining process corresponding to the condition information, the determining process being performed every time the target time represented by the time information elapses and determining whether a value of the target data represented by the data identification information changes between the previous target time and the current target time; transmit the value of the target data to the management system when the value of the target data changes; and not transmit the value of the target data to the management system when the value of the target data does not change.

11 Claims, 12 Drawing Sheets

FIG. 2

MONITORING TABLE 38

| | TERMINAL ID | DATA ID | TIME INFORMATION | ESTIMATION TIME | TRANSMISSION VALUE |
|---|---|---|---|---|---|
| 1 | TE80 | DA1 | 40(min) | 9:40 | 100 |
| 2 | TE80 | DA2 | 30(min) | 10:05 | 42201 |
| 3 | TE90 | DA1 | 90(min) | 9:45 | 100 |
| 4 | TE90 | DA3 | 20(min) | 10:00 | 80 |
| ... | ... | ... | ... | ... | ... |

FIG. 3

CONNECTION STATE LIST 70

| | PRINTER ID | CONNECTION STATE |
|---|---|---|
| 1 | PR10 | ONLINE |
| 2 | PR40 | OFFLINE |
| 3 | ... | ... |

FIG. 4

SUB LIST 72

| | PRINTER ID | TERMINAL ID | DATA ID | TIME INFORMATION | FLAG | DATA VALUE |
|---|---|---|---|---|---|---|
| 1 | PR10 | TE80 | DA1 | 40(min) | ON | — |
| 2 | PR10 | TE80 | DA2 | 30(min) | OFF | 42201 |
| 3 | PR10 | TE90 | DA1 | 90(min) | ON | — |
| 4 | PR10 | TE90 | DA3 | 20(min) | ON | — |
| 5 | PR40 | TE80 | DA2 | 360(min) | ON | — |
| ... | ... | ... | ... | ... | ... | ... |

COMMUNICATION APPARATUS

CROSS REFERENCE TO RELATED APPLICATION

This application is based upon and claims the benefit of priority of Japanese Patent Application No. 2013-053803 filed on Mar. 15, 2013, the contents of which are incorporated herein by reference in its entirety.

BACKGROUND

A communication apparatus for transmitting target data to a management system according to a condition information item will be disclosed in the present specification.

A related art discloses a system having a host computer and a printer. When the printer receives a drive set command from the host computer, the printer sets a condition to transmit a drive packet. As a result, for example, only in a case where the status of the printer changes, the printer transmits a drive packet representing the corresponding status to the host computer.

SUMMARY

In the related art, whenever the status of the printer changes, the printer transmits a drive packet representing the corresponding status to the host computer. Therefore, when a frequency at which the status of the printer changes is high, a frequency at which a drive packet is transmitted becomes high, and the load of a network between the printer and the host computer becomes high.

In this specification, a technology capable of reducing the load of a network between a communication apparatus and a management system is described.

An aspect of the present disclosure provides the following arrangements:

A communication apparatus configured to communicate with a management system, the communication apparatus comprising:

at least one processor; and at least one memory storing computer readable instructions when executed by the at least one processor causing the communication apparatus to:

store at lease one condition information in the at least one memory, each of the at least one condition information representing a condition to transmit data from the communication apparatus to the management system, each of the at least one condition information including data identification information to identify target data which is an object of transmission, and time information representing a target time which is a time corresponding to a transmission timing of the target data;

perform a determining process corresponding to each of the at least one condition information stored in the memory, the determining process being performed every time the target time represented by the time information elapses, and the determining process being a process of determining whether a value of the target data represented by the data identification information changes between the previous target time and the current target time;

transmit the value of the target data to the management system when it is determined in the determining process that the value of the target data changes; and not transmit the value of the target data to the management system when it is determined in the determining process that the value of the target data does not change.

Control methods and computer programs for implementing the above described communication apparatus, and computer-readable recording media having the corresponding computer programs stored therein are also new and useful.

BRIEF DESCRIPTION OF DRAWINGS

FIG. 2 shows an example of a monitoring table of a printer.

FIG. 3 shows an example of a connection state list of a relay server.

FIG. 4 shows an example of a SUB (an abbreviation for Subscribe) list of the relay server.

DESCRIPTION OF EXEMPLARY EMBODIMENTS (First Embodiment)

(Configuration of Communication System 2)

Figure 1:
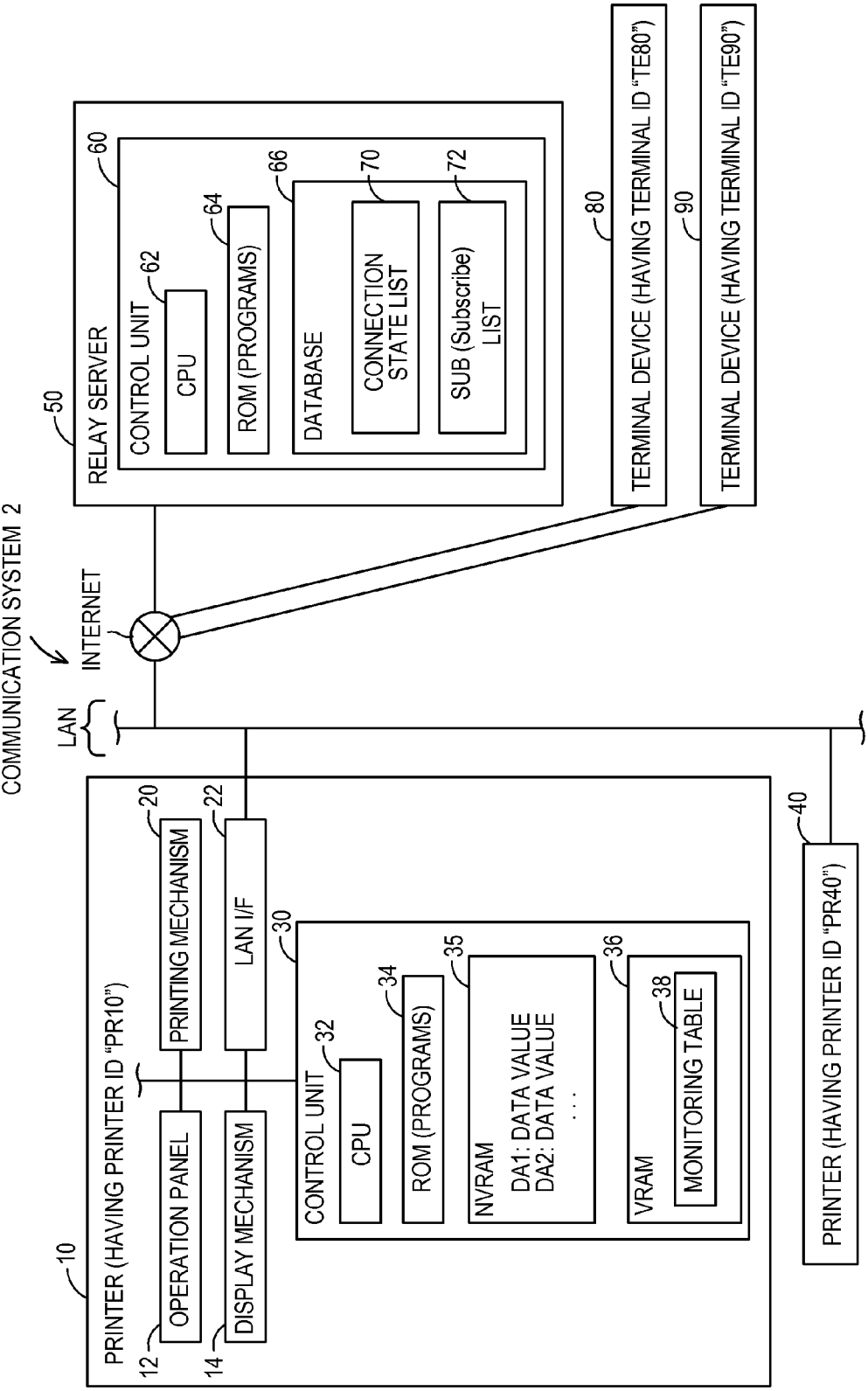
FIG. 1 shows the configuration of a communication system.

As shown in FIG. 1, a communication system 2 includes a plurality of printers 10 and 40, a relay server 50, and a plurality of terminal devices 80 and 90. The printers 10 and 40 are connected to a LAN (an abbreviation for Local Area Network), and the relay server 50 and the terminal devices 80 and 90 are connected to the Internet.

As will be described below, in the communication system 2, a Subscribe command of HTTP (Hyper Text Transfer Protocol) is transmitted from the terminal device 80 or 90 to the printer 10 or 40 through the relay server 50. Then, the printer 10 or 40 transmits target data indicated by the Subscribe command, to the terminal device 80 or 90 at a timing indicated by the Subscribe command. In order to implement communications of Subscribe commands and communications of target data, the individual devices such as the printer 10 have the following configurations. Hereinafter, a Subscribe command will be referred to as a SUB command.

(Configurations of Printers 10 and 40)

The printers 10 and 40 are peripheral devices (that is, peripheral devices of a PC (an abbreviation for Personal Computer) or the like) capable of implementing a printing function. The printers 10 and 40 have "PR10" and "PR40" as printer IDs, respectively. The printer IDs are unique IDs which are assigned by the vendor of the printers 10 and 40. Since the printers 10 and 40 have the same configuration, hereinafter, the configuration of the printer 10 will be described in detail, and the configuration of the printer 40 will not be described.

The printer 10 includes an operation panel 12, a display mechanism 14, a printing mechanism 20, a LAN interface 22, and a control unit 30. The individual units 12 to 30 are connected to a bus line (whose reference symbol is omitted). Hereinafter, an interface will be referred to as an I/F.

The operation panel 12 has a plurality of keys. A user can operate the operation panel 12, thereby giving a variety of instructions to the printer 10. The display mechanism 14 is a display for displaying a variety of information. The printing mechanism 20 is a printing mechanism of an inkjet type, a laser type, or the like. The LAN I/F 22 is an I/F for connection to the LAN. The LAN may be a wired LAN or may be a wireless LAN.

The control unit 30 includes a CPU 32, a ROM (an abbreviation for Read Only Memory) 34, an NVRAM (an abbreviation for Non-Volatile Random Access Memory) 35, and a VRAM (an abbreviation for Volatile Random Access Memory) 36. The CPU 32 performs a variety of processes according to programs stored in the ROM 34.

The NVRAM 35 is a non-volatile memory. That is, even if the power supply of the printer 10 is turned off, information stored in the NVRAM 35 is retained (that is, the information is not deleted). With respect to each of a plurality of data items (hereinafter, referred to as target data) relating to the printer 10, the NVRAM 35 stores a data ID (for example, "DA1") for identifying the corresponding target data, and the current value of the corresponding target data, in association with each other. Examples of target data can include (1) data representing the total number of print media having been printed by the printer 10 (that is, the number of printed media), (2) data representing the residual amount of a consumable (for example, ink or toner) which is used for the printer 10 to perform printing, (3) data representing the history (that is, log) of processes having been performed by the printer 10, and so on.

The VRAM 36 is a volatile memory. That is, while the power supply of the printer 10 is in an ON state, information stored in the VRAM 36 is retained. However, when the power supply of the printer 10 is turned off, the information stored in the VRAM 36 is deleted. The VRAM 36 stores a variety of data which is generated or acquired in the course in which the printer 10 performs a variety of processes. The VRAM 36 stores a monitoring table 38 (to be described below).

(Monitoring Table 38 (FIG. 2))

As described above, the monitoring table 38 is stored in the VRAM 36. Therefore, when the power supply of the printer 10 is turned off, the monitoring table 38 is deleted from the VRAM 36.

The monitoring table 38 includes a plurality of monitoring information items. Each monitoring information item is information including a terminal ID, a data ID, time information, an estimation time, and a transmission value associated with one another. The terminal ID, the data ID, and the time information are information items which are included in a SUB command which is received from the terminal device 80 or 90 through the relay server 50, and are described in STEP S108 of FIG. 7 (to be described below). Each of the estimation time and the transmission value is an information item which is generated by the printer 10, and is described in STEP S108 of FIG. 7, or STEP S134 or S138 of FIG. 8.

The terminal ID is an information item for identifying the terminal device 80 or 90. The terminal devices 80 and 90 have "TE80" and "TE90" as terminal IDs, respectively. The data ID is an information item for identifying target data. The time information is a time representing an interval (that is, a cycle) for performing a determining process (STEP S132 of FIG. 8 to be described below) on whether there is any change in the value of the target data. The estimation time is a time to perform the above described determining process. The transmission value is a target data value having been transmitted.

(Configuration of Relay Server 50 (FIG. 1))

The relay server 50 is a server which is set on the Internet by the vendor of the printers 10 and 40. The relay server 50 manages lists 70 and 72 (to be described below), and performs a variety of processes (for example, relaying of communication between the printer 10 or 40 and the terminal device 80 or 90) for the printers 10 and 40 and the terminal devices 80 and 90.

The relay server 50 includes a control unit 60. The control unit 60 includes a CPU 62, a ROM 64, and a database 66. The CPU 62 performs a variety of processes according to programs stored in the ROM 64. The database 66 stores a connection state list 70 and a SUB list 72 (to be described below).

(Connection State List 70 (FIG. 3))

As shown in FIG. 3, the connection state list 70 includes a plurality of connection information items. Each connection information item is information representing whether an XMPP (an abbreviation for eXtensible Messaging and Presence Protocol) connection has been formed between a corresponding printer 10 or 40 and the relay server 50, and is described in STEP S42 or S52 of FIG. 6 (to be described below).

Each connection information item is information including a printer ID and a connection state associated with each other. The connection state represents any one value of "ONLINE" and "OFFLINE". The connection state "ONLINE" represents that a corresponding XMPP connection has been formed, and the connection state "OFFLINE" represents that a corresponding XMPP connection has not been formed.

(Sub List 72 (FIG. 4))

The SUB list 72 includes a plurality of SUB information items. Each SUB information item is information including a printer ID, a terminal ID, a data ID, time information, a flag, and a data value associated with one another. The printer ID, the terminal ID, the data ID, the time information, and the flag are information items which are included in a SUB command which is received from the terminal device 80 or 90, and are described in STEP S16 of FIG. 5 (to be described below). The data value is the value of target data which is received from the printer 10 or 40, and is described in STEP S66 of FIG. 6 (to be described below).

The flag represents any one value of "ON" and "OFF". The flag "ON" is a value for performing a process of transmitting a target file including target data to the terminal device 80 or 90 immediately after the target file is received from the printer 10 or 40 ("YES" in STEP S62 of FIG. 6 to be described below). The flag "OFF" is a value for performing a process (STEP S66 of FIG. 6 to be described below) of describing the value of target data, included in a target file, in the SUB list 72, in a case where the target file is received from the printer 10 or 40, and a process (STEP S32 of FIG. 5 to be described below) of transmitting a target file including the described value to the terminal device 80 or 90, in a case where a GET command of HTTP is received from the terminal device 80 or 90. The data value is an information item which is described only in a case where the flag is "OFF", and is the value of target data which is included in a target file which is received from the printer 10 or 40.

(Configurations of Terminal Devices 80 and 90 (FIG. 1))

The terminal devices 80 and 90 are installed, for example, in shops for selling a variety of products (printers, scanners, copy machines, facsimiles, multi-function apparatuses, and so on) manufactured by the vendor of the printers 10 and 40. Each of the terminal devices 80 and 90 is a computer (for example, a PC) having a known OS, and has an application (hereinafter, referred to as a management application) which is provided by the vendor of the printers 10 and 40. The management application is a program for performing a process for transmitting or receiving a variety of commands, files, and the like to or from the relay server 50.

(Processes which are Performed by CPU 62 of Relay Server 50 (FIGS. 5 and 6))

Figure 5:
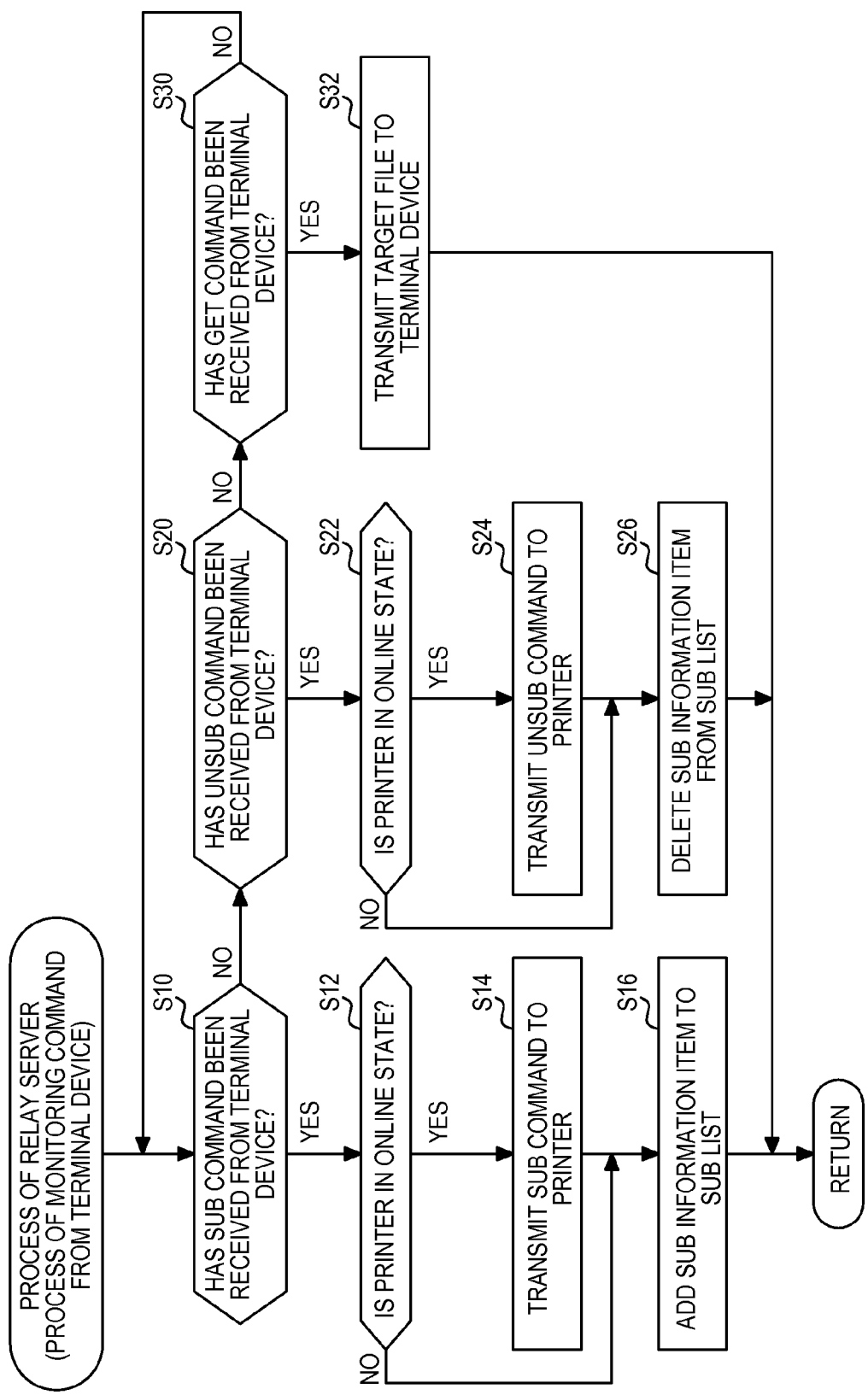
FIG. 5 shows the flow chart of a process of the relay server for monitoring a command from a terminal device.
Figure 6:
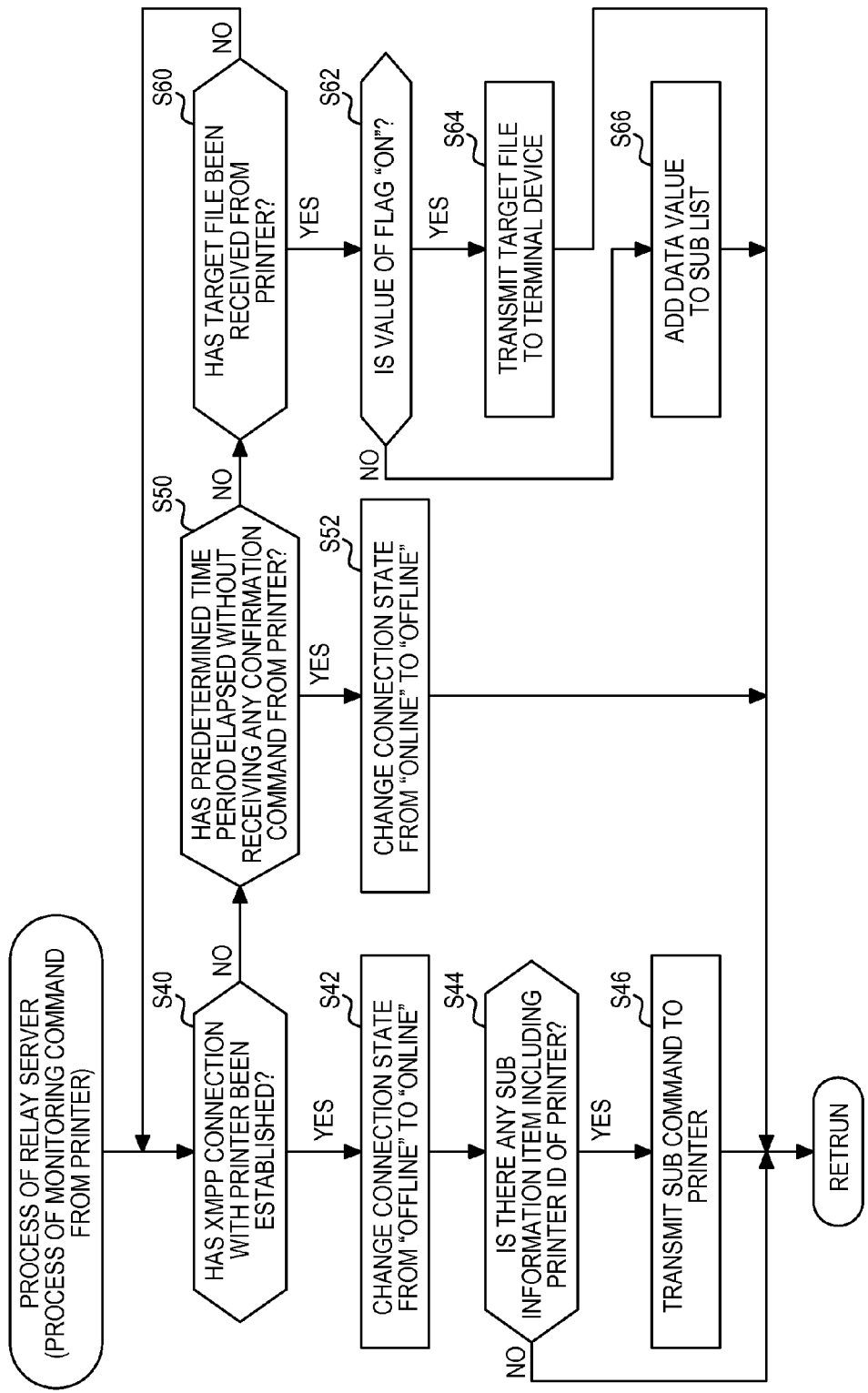
FIG. 6 shows the flow chart of a process of the relay server for monitoring a command from a printer.

Subsequently, processes which are performed by the CPU 62 of the relay server 50 will be described with reference to FIGS. 5 and 6. FIG. 5 shows a process of monitoring a command from the terminal device 80 or 90, and FIG. 6 shows a process of monitoring a command from the printer 10.

(Process of Monitoring Command from Terminal Device 80 or 90 (FIG. 5))

When an instruction for performing a command monitoring process is received from the terminal device 80 or 90, the CPU 62 starts the process of FIG. 5. The CPU 62 monitors reception of a SUB command, an Unsubscribe command, or a GET command from the terminal device 80 or 90 (that is, the CPU 62 repeatedly performs this monitoring in a case where all of the determination results of STEPS S10, S20, and S30 are "NO"). Hereinafter, an Unsubscribe command will be referred to as an UNSUB command.

(Monitoring of Sub Command)

For example, in a case where the user of the terminal device 80 (that is, a worker of a corresponding shop) desires to acquire target data relating to the printer 10 or the printer 40, the user activates the management application of the terminal device 80, and inputs information items for performing transmission of a SUB command, to the terminal device 80. Hereinafter, a printer with respect to which the user desires to acquire target data will be referred to as a target printer.

The user inputs a printer ID (for example, "PR 10") corresponding to the target printer, a data ID (for example, "DA1") corresponding to the target data, time information (for example, "40 min") representing an interval time for making the printer 10 perform a determining process on whether there is any change in the value of the target data, and the flag (for example, "ON"), to the terminal device 80.

The user can designate an arbitrary time as the time information. As will be described below in detail, in a case where the time represented by the time information is long, an interval at which the target printer performs the determining process on whether there is any change in the value of the target data becomes long, and in a case where the time represented by the time information is short, the interval at which the target printer performs the determining process becomes short. In a case where it is determined in the determining process that there is a change in the value of the target data (for example, there is a change in the number of printed media), the target printer transmits a target file including the current value of the target data (for example, the current number of printed media) to the relay server 50. In a case where it is determined in the determining process that there is no change in the value of the target data (for example, there is no change in the number of printed media), the target printer does not transmit any target file. Therefore, in a case where the time represented by the time information is long, a frequency at which a target file is transmitted from the target printer becomes low, and in a case where the time represented by the time information is short, the frequency at which a target file is transmitted from the target printer becomes high.

The user can designate "ON" or "OFF" as the value of the flag. In a case where the user desires transmission of a target file from the relay server 50 to the terminal device 80 to be performed immediately after transmission of the target file from the target printer to the relay server 50, the user designates "ON" as the value of the flag. In a case where the user desires transmission of a target file from the relay server 50 to the terminal device 80 to be performed in response to transmission of a GET command from the terminal device 80 to the relay server 50, the user designates "OFF" as the value of the flag.

When the above described information items (that is, the printer ID, the data ID, the time information, and the flag) are input by the user, the terminal device 80 generates a SUB command including the input information items and a terminal ID "TE80" corresponding to the terminal device 80. Thereafter, the terminal device 80 transmits the generated SUB command to the relay server 50. Meanwhile, when the user inputs the information items to the terminal device 90, not to the terminal device 80, a SUB command is transmitted from the terminal device 90 to the relay server 50. In this case, the SUB command includes a terminal ID "TE90" corresponding to the terminal device 90, not the terminal ID "TE80" corresponding to the terminal device 80.

In a case where a SUB command is received from the terminal device 80 or 90, the CPU 62 of the relay server 50 determines "YES" in STEP S10 of FIG. 5, and proceeds to STEP S12. In STEP S12, the CPU 62 determines whether an XMPP connection has been formed between the target printer and the relay server 50. Specifically, the CPU 62 reads a connection state associated with a printer ID (for example, "PR10") included in the received SUB command, from the connection state list 70 (see FIG. 3). Then, in a case where the corresponding connection state represents "ONLINE", the CPU 62 determines that the XMPP connection has been formed ("YES" in STEP S12), and proceeds to STEP S14. Meanwhile, in a case where the corresponding connection state represents "OFFLINE", the CPU 62 determines that the XMPP connection has not been formed ("NO" in STEP S12), and proceeds to STEP S16 (that is, the CPU 62 skips STEP S14).

In STEP S14, the CPU 62 extracts a printer ID, a terminal ID, a data ID, and time information from information items (that is, the printer ID, the terminal ID, the data ID, the time information, and a flag) included in the received SUB command, and generates a new SUB command including the extracted information items. That is, the new SUB command generated in STEP S14 does not include the flag. The reason is that the flag is not used in the target printer.

Next, the CPU 62 uses the XMPP connection (that is, the XMPP connection between the target printer and the relay server 50), which is the object of the determination of STEP S12, to transmit the generate SUB command (that is, the above described new SUB command) to the target printer. How to establish the XMPP connection, and how to use the XMPP connection to transmit the SUB command will be described below in detail with reference to FIG. 9.

The LAN connected to the printers 10 and 40 has a NAT (an abbreviation for Network Address Translation) router for relaying Internet communications. Therefore, in a state where the XMPP connection (that is, a so-called constant connection) has been formed between the target printer and the relay server 50, the NAT router allows transmission of data (for example, a SUB command) from the Internet side (that is, the relay server 50) to the LAN side (that is, the target printer).

Meanwhile, in a state where the XMPP connection has not been formed, the NAT router prohibits transmission of the corresponding data.

In view of existence of the NAT router, in the present embodiment, in STEP S12, the CPU 62 of the relay server 50 determines whether the XMPP connection has been formed between the target printer and the relay server 50. Then, in a case where it is determined that the XMPP connection has been formed ("YES" in STEP S12), in STEP S14, the CPU 62 transmits the generated SUB command to the target printer. Therefore, the CPU 62 can appropriately transmit the generated SUB command to the target printer through the NAT router.

As will be described below in detail, when the SUB command is received from the relay server 50, the target printer adds a monitoring information item corresponding to the SUB command, to the monitoring table (see the monitoring table 38 of FIG. 1), and transmits a target file including the current value of the target data (for example, the number of printed media, the residual amount of a consumable, or the like) to the relay server 50 according to the corresponding monitoring information item in STEP S106 of FIG. 7 or STEP S150 of FIG. 8 (to be described below). Therefore, the user of the terminal device 80 or 90 (that is, a worker of a corresponding shop) can see the current value of the target data relating to the target printer, and can provide a service according to the corresponding current value (for example, a print-medium replenishing service, a consumable replacing service, or the like) to the user of the target printer.

In a case where it is determined that the XMPP connection has not been formed ("NO" in STEP S12), the CPU 62 does not perform a process for transmitting the SUB command to the target printer (that is, the CPU 62 skips STEP S14). However, as will be described below in detail, in a case where an XMPP connection is newly formed between the target printer and the relay server 50, the CPU 62 can appropriately transmit the SUB command to the target printer (refer to STEP S46 of FIG. 6 to be described below).

In STEP S16, the CPU 62 adds a SUB information item corresponding to the received SUB command, to the SUB list 72 stored in the database 66. Specifically, the CPU 62 adds a SUB information item in which the individual information items (that is, the printer ID, the terminal ID, the data ID, the time information, and the flag) included in the received SUB command are associated with one another, to the SUB list 72. At this time, even if the flag is "OFF", any data value is not described. The data value is described in STEP S66 of FIG. 6 (to be described below).

(Monitoring of UNSUB Command)

In a case where the user of the terminal device 80 or 90 desires to stop acquiring of target data from the printer 10 or 40, for example, the user activates the management application of the terminal device 80 and inputs information items for performing transmission of an UNSUB command to the terminal device 80. Hereinafter, a printer with respect to which the user desires to stop transmission of target data will be referred to as a target printer. The user inputs a printer ID (for example, "PR10") corresponding to the target printer, and a data ID (for example, "DA1") corresponding to the target data, to the terminal device 80.

When the above described information items (that is, the printer ID and the data ID) are input by the user, the terminal device 80 generates an UNSUB command, which includes the input information items, and a terminal ID "TE80" corresponding to the terminal device 80. Then, the terminal device 80 transmits the generated UNSUB command to the relay server 50. Meanwhile, when the user inputs the information items to the terminal device 90, not to the terminal device 80, an UNSUB command is transmitted from the terminal device 90 to the relay server 50. In this case, the UNSUB command includes a terminal ID "TE90" corresponding to the terminal device 90.

In a case where an UNSUB command is received from the terminal device 80 or 90, the CPU 62 of the relay server 50 determines "YES" in STEP S20 of FIG. 5, and proceeds to STEP S22. In STEP S22, the CPU 62 determines whether an XMPP connection has been formed between a target printer and the relay server 50. The determining process of FIG. 22 is the same as the determining process of STEP S12. In a case where it is determined that the XMPP connection has been formed ("YES" in STEP S22), the CPU 62 proceeds to STEP S24. Meanwhile, in a case where it is determined that the XMPP connection has not been formed ("NO" in STEP S22), the CPU 62 proceeds to STEP S26 (that is, the CPU 62 skips STEP S24).

In STEP S24, the CPU 62 uses the XMPP connection which is the object of the determination of STEP S22, to transmit the received UNSUB command to the target printer. Since the CPU 62 uses the XMPP connection, the CPU 62 can appropriately transmit the UNSUB command to the target printer through the NAT router.

As will be described below in detail, when the UNSUB command is received from the relay server 50, the target printer stops transmission of a target file including the target data according to the UNSUB command (STEP S122 of FIG. 7 to be described below). As a result, any target file cannot be transmitted from the target printer. Therefore, it is possible to reduce the processing loads of the individual devices (that is, the target printer, the relay server 50, and the terminal device 80 or 90) and the load of the network between the individual devices.

In the case where the XMPP connection has not been formed ("NO" in STEP S22), the CPU 62 does not perform the process for transmitting the UNSUB command to the target printer (that is, the CPU 62 skips STEP S24). Further, even if an XMPP connection is newly formed between the target printer and the relay server 50, the CPU 62 does not transmit the UNSUB command to the target printer, unlike in the case of the SUB command. The reason will be described below.

The target printer (for example, the printer 10) stores a monitoring table including a monitoring information item for performing transmission of the target file, in a VRAM (for example, the VRAM 36) (see, for example, the monitoring table 38 of the VRAM 36 of FIG. 1). Then, in a case where the XMPP connection has not been formed, the power supply of the target printer is highly likely to be in an OFF state. Since the monitoring table is deleted when the power supply of the target printer is turned off, even if the UNSUB command is not transmitted to the target printer, the target printer stops transmission of the target file. In view of this circumstances, the CPU 62 does not transmit the UNSUB command to the target printer.

In STEP S26, the CPU 62 deletes a SUB information item corresponding to the received UNSUB command, from the SUB list 72 stored in the database 66. Specifically, the CPU 62 deletes a SUB information item including the information items (that is, the printer ID, the terminal ID, and the data ID) included in the UNSUB command, from the SUB list 72.

(Monitoring of GET Command)

As described above, for example, the user of the terminal device 80 can input the flag "ON" or "OFF", as an information item for performing transmission of a SUB command, to the terminal device 80. In a case where the user inputs the flag "OFF" to the terminal device 80, thereby making the terminal device 80 perform transmission of a SUB command, thereafter, at an arbitrary timing, the user can input information items (that is, a printer ID and a data ID) for transmitting a GET command of HTTP, to the terminal device 80. In this case, the terminal device 80 transmits a GET command including the above described information items (that is, the printer ID and the data ID) and the terminal ID "TE80" of the terminal device 80, to the relay server 50. Meanwhile, when the terminal device 90, not the terminal device 80, transmits a GET command, including information items, to the relay server 50, the GET command includes a terminal ID "TE90" corresponding to the terminal device 90.

In a case where a GET command is received from the terminal device 80 or 90, the CPU 62 of the relay server 50 determines "YES" in STEP S30 of FIG. 5, and proceeds to STEP S32. In STEP S32, the CPU 62 reads a data value (for example, a data value "42201" of FIG. 4) associated with information items (that is, a printer ID, a terminal ID, and a data ID) included in the received GET command, from the SUB list 72. Then, the CPU 62 generates a target file including the corresponding data value. The corresponding target file further includes the printer ID, the terminal ID, and the data ID included in the received GET command. Next, the CPU 62 transmits the generated target file to the terminal device 80 or 90 which is the transmission source of the received GET command.

(Process of Monitoring Command from Printer 10 or 40 (FIG. 6))

When an instruction for performing a command monitoring process is received from the printer 10 or 40, the CPU 62 starts the process of FIG. 6. As shown in FIG. 6, the CPU 62 monitors whether a notification for establishing an XMPP connection has been received from the printer 10 or 40, whether a predetermined time period has been elapsed without receiving any confirmation command, and whether a target file has been received (that is, the CPU 62 repeatedly performs this monitoring in a case where all of the determination results of STEPS S40, S50, and S60 are "NO").

(Monitoring of Notification for Establishing XMPP Connection)

As will be described below in detail with reference to FIG. 9, for example, in a case where the power supply of the printer 10 or 40 is turned on, the corresponding printer transmits a request signal (for example, a request signal 154 of FIG. 9 to be described below) including a notification for establishing an XMPP connection, to the relay server 50 (refer to STEP S100 of FIG. 7 to be described below). Hereinafter, the printer which is the transmission source of the above described request signal will be referred to as the target printer.

In a case where the above described request signal is received from the target printer, the CPU 62 of the relay server 50 establishes the XMPP connection between the target printer and the relay server 50. In this case, the CPU 62 determines "YES" in STEP S40, and proceeds to STEP S42.

In STEP S42, the CPU 62 changes the contents of the connection state list 70 (see FIG. 3). Specifically, the CPU 62 changes a connection state associated with a printer ID corresponding to the target printer, from "OFFLINE" to "ONLINE".

Next, in STEP S44, with reference to the SUB list 72, the CPU 62 determines whether there is one or more SUB information items including the printer ID corresponding to the target printer. In a case where there is one or more SUB information items including the printer ID corresponding to the target printer ("YES" in STEP S44), the CPU 62 proceeds to STEP S46. Meanwhile, in a case where there is no SUB information item including the printer ID corresponding to the target printer ("NO" in STEP S44), the CPU 62 skips STEP S46, and returns to STEP S40.

In STEP S46, with respect to each of the above described one or more SUB information items, the CPU 62 generates a SUB command including information items (that is, a printer ID, a terminal ID, a data ID, and time information) included in the corresponding SUB information item. That is, the CPU 62 uses the above described one or more SUB information items to generate one or more SUB commands. Thereafter, the CPU 62 uses the XMPP connection formed in STEP S40, to transmit the generated one or more SUB commands to the target printer.

As described above, in a case where the power supply of the target printer is turned on ("YES" in STEP S40), that is, in a case where the XMPP connection is formed between the target printer and the relay server 50, in STEP S46, one or more SUB commands are transmitted from the relay server 50 to the target printer. As a result, it is possible to achieve the following effects (1) and (2).

(1) For example, while the power supply of the target printer is in the OFF state, the relay server 50 can receive a SUB command which needs to be transmitted to the target printer, from the terminal device 80 or 90. In this situation, the relay server 50 stores a SUB information item corresponding to the SUB command, in the SUB list 72 (in STEP S16 in a case of "NO" in STEP S12 of FIG. 5). Thereafter, when the power supply of the target printer is turned on (that is, in a case where "YES" is determined in STEP S40, and STEP S42 is performed, and then "YES" is determined in STEP S44 of FIG. 6), the relay server 50 can appropriately transmit a SUB command corresponding to the SUB information item stored in the SUB list 72, to the target printer in STEP S46.

(2) For example, it is assumed a situation in which the target printer transitions from a first power-on state to a second power-on state through a power-off state. That is, it is assumed a situation in which a transition from a state where there is a first XMPP connection formed between the target printer (the first power-on state) and the relay server 50 to a state where there is a second XMPP connection formed between the target printer (the second power-on state) and the relay server 50 is made through interruption of the first XMPP connection.

While the target printer is in the first power-on state, the relay server 50 can receive a SUB command which needs to be transmitted to the target printer, from the terminal device 80 or 90. In this case, the relay server 50 uses the first XMPP connection to transmit the SUB command to the target printer (in STEP S14 in a case of "YES" in STEP S12 of FIG. 5), and then stores a SUB information item corresponding to the SUB command, in the SUB list 72 stored in the database 66 (in STEP S16). While the target printer is in the first power-on state, the target printer receives a SUB command from the relay server 50, and adds a monitoring information item corresponding to the SUB command in the monitoring table stored in the VRAM (in STEP S108 of FIG. 7 to be described below).

However, when the target printer transitions to the power-off state, the monitoring table including the monitoring information item is deleted from the VRAM which is a volatile memory. Thereafter, in a case where the target printer transitions to the second power-on state ("YES" in STEPS S40, S42, and S44 of FIG. 6), the relay server 50 can use the second XMPP connection to appropriately transmit the SUB command, corresponding to the SUB information item stored in the SUB list 72, to the target printer.

That is, in a case where the target printer is in the first power-on state, the relay server 50 can transmit the SUB command to the target printer, and in a case where the target printer changes from the power-off state to the second power-on state, the relay server 50 can transmit the SUB command to the target printer again. For this reason, even if the power supply of the target printer is turned off, whereby the monitoring table including the monitoring information item is deleted from the target printer, the relay server 50 can transmit the SUB command to the target printer again. As a result, the target printer can appropriately perform transmission of the target data according to the SUB command.

(Monitoring of Confirmation Command)

Hereinafter, a printer with respect to which an XMPP connection has been formed will be referred to as a target printer. While the power supply of the target printer is in the ON state, that is, while the XMPP connection is maintained, the target printer can regularly transmit a confirmation command to the relay server 50. However, when the power supply of the target printer is turned off, the target printer cannot transmit any confirmation command to the relay server 50.

The CPU 62 of the relay server 50 monitors whether any confirmation command has been received from the target printer. After the XMPP connection with the target printer is formed, or after a confirmation command is received from the target printer, when a predetermined time period elapses without receiving the next confirmation command, the CPU 62 determines "YES" in STEP S50, and proceeds to STEP S52. Specifically, in response to establishment of the XMPP connection with the target printer, the CPU 62 starts a timer. Then, whenever a confirmation command is received from the target printer, the CPU 62 resets and restarts the timer. The CPU 62 can determine whether the value of the timer represents elapse of the predetermined time period, thereby performing the determination of STEP S50.

In STEP S52, the CPU 62 changes the contents of the connection state list 70 (see FIG. 3). Specifically, the CPU 62 changes a connection state associated with a printer ID corresponding to the target printer, from "ONLINE" to "OFFLINE".

(Monitoring of Target File)

In a case where a SUB command is received from the relay server 50 (a case of "YES" in STEP S104 of FIG. 7 to be described below), or in a case where it is determined in the determining process according to a monitoring information item corresponding to a SUB command that the value of target data has changed (a case of "NO" in STEP S132 of FIG. 8 to be described below), the printer 10 or 40 transmits a target file including the current value of the target data, to the relay server 50. Hereinafter, the printer which is the transmission source of the target file will be referred to as the target printer. The target file includes not only the current value of the target data but also a printer ID corresponding to the target printer, a terminal ID, and a data ID.

In a case where the target file is received from the target printer, the CPU 62 of the relay server 50 determines "YES" in STEP S60, and proceeds to STEP S62.

In STEP S62, the CPU 62 reads the value of the flag associated with the information items (that is, the printer ID, the terminal ID, and the data ID) included in the received target file, from the SUB list 72. Then, the CPU 62 determines whether the value of the corresponding flag is "ON". In a case where the value of the corresponding flag is "ON" ("YES" in STEP S62), the CPU 62 proceeds to STEP S64. Meanwhile, in a case where the value of the corresponding flag is "OFF" ("NO" in STEP S62), the CPU 62 proceeds to STEP S66.

In STEP S64, the CPU 62 transmits the received target file to the terminal device 80 or 90 corresponding to the terminal ID included in the received target file. Specifically, the relay server 50 establishes an XMPP connection even with the terminal device 80 or the 90, similarly to the XMPP connection with the printer 10 or 40. Therefore, the CPU 62 can appropriately transmit the received target file to the terminal device 80 or 90 through the NAT router.

In STEP S66, the CPU 62 changes the contents of the SUB list 72. Specifically, the CPU 62 describes the current value of the target data included in the received target file, in a data value section associated with the information items (that is, the printer ID, the terminal ID, and the data ID) included in the received target file. Therefore, in a case where an HTTP command is received from the terminal device 80 or 90 ("YES" in STEP S30 of FIG. 5), the CPU 62 can transmit a target file including the current value of the target data, to the terminal device 80 or 90 (in STEP S32).

(Processes which are Performed by CPU 32 of Printer 10)

Subsequently, processes which are performed by the CPU 32 of the printer 10 will be described. Although not shown in a flow chart, whenever the value of target data (for example, the number of printed media) relating to the printer 10 changes, the CPU 32 changes the value of the target data stored in the NVRAM 35. Therefore, in the NVRAM 35, the current value (that is, latest value) of the target data is stored. Further, information stored in the NVRAM 35 is not deleted even if the power supply of the printer 10 is turned off.

(Communication Process (FIG. 7))

A communication process which is performed by the CPU 32 of the printer 10 will be described with reference to FIG. 7. When the power supply of the printer 10 is turned on, the CPU 32 starts the process of FIG. 7. The printer 40 can perform the process of FIG. 7, similarly to the printer 10.

In STEP S100, the CPU 32 transmits a request signal (for example, the request signal 154 of FIG. 9 to be described below) including a notification for establishing an XMPP connection, to the relay server 50. As a result, the CPU 32 establishes the XMPP connection between the printer 10 and the relay server 50.

Next, the CPU 32 starts a time monitoring process (see FIG. 8) in STEP S102, and then proceeds to STEP S104. The contents of the time monitoring process will be described below in detail.

Subsequently, the CPU 32 monitors reception of a SUB command or an UNSUB command from the relay server 50 (that is, the CPU 32 repeatedly performs this monitoring in a case where all of the determination results of STEPS S104 and S120 are "NO"). As described above, the relay server 50 can transmit a SUB command to the printer 10 in STEP S14 of FIG. 5 or STEP S46 of FIG. 6. In a case where a SUB command is received from the relay server 50, the CPU 32 determines "YES" in STEP S104, and proceeds to STEP S106.

In STEP S106, the CPU 32 reads the current value of target data associated with a data ID included in the received SUB command, from the NVRAM 35. Thereafter, the CPU 32 generates a target file including information items (that is, a printer ID, a terminal ID, and the data ID) included in the received SUB command, and the current value of the corresponding target data. Next, the CPU 32 transmits the generated target file to the relay server 50. Therefore, immediately after the SUB command is received from the relay server 50, the CPU 32 can transmit the target file including the current value of the target data, to the relay server 50. That is, after the SUB command is received from the relay server 50, the CPU 32 can transmit the target file to the relay server 50 before a time represented by time information included in the corresponding SUB command elapses. For this reason, the CPU 32 can quickly transmit the target file to the relay server 50.

In STEP S108, the CPU 32 adds a monitoring information item corresponding to the received SUB command, to the monitoring table 38 stored in the VRAM 36. Specifically, the CPU 32 first adds the time represented by the time information included in the received SUB command, to the current time, thereby calculating an estimation time. Thereafter, the CPU 32 adds a monitoring information item in which the information items (that is, the terminal ID, the data ID, and the time information) included in the received SUB command, the calculated estimation time, and the current value of the target data transmitted in STEP S106 are associated with one another, to the SUB list 72. When finishing STEP S108, the CPU 32 returns to STEP S104.

As described above, in STEP S24 of FIG. 5, the relay server 50 can transmit an UNSUB command to the printer 10. In a case where an UNSUB command is received from the relay server 50, the CPU 32 determines "YES" in STEP S120, and proceeds to STEP S122.

In STEP S122, the CPU 32 deletes a monitoring information item including information items (that is, a terminal ID and a data ID) included in the received UNSUB command, from the monitoring table 38 stored in the VRAM 36. Therefore, the CPU 32 does not need to perform the time monitoring process (to be described below) (see FIG. 8) according to the corresponding monitoring information item. For this reason, it is possible to reduce the processing load of the printer 10. When finishing STEP S122, the CPU 32 returns to STEP S104.

(Time Monitoring Process (FIG. 8))

Subsequently, the contents of the time monitoring process which is started in STEP S102 of FIG. 7 will be described with reference to FIG. 8. Even if the power supply of the printer 10 is in the ON state, in a case where the XMPP connection has not been formed between the printer 10 and the relay server 50 (for example, a case where a cable has not been connected to the LAN I/F 22 of the printer 10, a case where the communication option of the printer 10 is an option to prohibit Internet communications, or the like), the CPU 32 does not perform the time monitoring process of FIG. 8. The reason is that in the case where the XMPP connection has not been formed between the printer 10 and the relay server 50, the printer 10 cannot transmit any target file to the relay server 50.

In STEP S130, the CPU 32 determines whether there is any target monitoring information item in the plurality of monitoring information items stored in the monitoring table 38. A target monitoring information item is a monitoring information item including an estimation time coinciding with the current time (or an estimation time later than the current time). In a case where there is a target monitoring information item, the CPU 32 determines "YES" in STEP S130, and proceeds to STEP S132.

In STEP S132, first, the CPU 32 reads the current value of target data associated with a data ID included in the target monitoring information item, from the NVRAM 35. Next, the CPU 32 compares the transmission value of the target monitoring information item (that is, the previous transmission value of the target data) with the current value of the target data. In a case where the transmission value and the current value coincide with each other, the CPU 32 determines "YES" in STEP S132, and proceeds to STEP S134. Meanwhile, in a case where the transmission value and the current value do not coincide with each other, the CPU 32 determines "NO" in STEP S132, and proceeds to STEP S136.

In STEP S134, the CPU 32 adds a time represented by the time information of the target monitoring information item, to the estimation time of the target monitoring information item, thereby calculating a new estimation time. Thereafter, the CPU 32 describes the calculated new estimation time in an estimation time section of the target monitoring information item. When finishing STEP S134, the CPU 32 returns to STEP S130. That is, in a case where it is determined in STEP S132 that the transmission value and the current value coincide with each other, the CPU 32 does not transmit a target file including the current value of the target data, to the relay server 50. Therefore, it is possible to reduce the processing loads of individual devices (that is, the printer 10, the relay server 50, and the terminal device 80 or 90), and it is possible to reduce the load of the network between the individual devices.

In STEP S136, the CPU 32 generates a target file including a transmission information item corresponding to the target monitoring information item. Specifically, the CPU 32 generates a transmission information item including the information items (that is, a terminal ID and the data ID) included in the target monitoring information item, a printer ID "PR10" corresponding to the printer 10, and the current value of the target data corresponding to the data ID included in the target monitoring information item, and generates a target file including the corresponding transmission information item.

Next, in STEP S138, first, the CPU 32 changes the estimation time of the target monitoring information item by use of the same method as that in STEP S134. Further, the CPU 32 describes the current value of the target data in a transmission value section of the target monitoring information item.

Subsequently, in STEP S150, the CPU 32 transmits the generated target file to the relay server 50. Thereafter, the CPU 32 returns to STEP S130. For example, in a case where any trouble has occurred in the relay server 50 (for example, a case where the relay server 50 is down), the CPU 32 cannot transmit the target file to the relay server 50. In this case, the CPU 32 repeatedly tries to transmit the target file to the relay server 50, and in a case where it is impossible to transmit the target file even if a predetermined number of trials is performed, the CPU 32 determines timeout, and stops transmission of the target file, and returns the current value of the target data having been changed in STEP S138, to its original value.

According to this configuration, even in a case where it is impossible to transmit the target file to the relay server 50 in STEP S150, when the CPU 32 determines "YES" in STEP S130 of the next or subsequent time, the CPU 32 can use the above described original value to perform the determination of STEP S132. Therefore, the CPU 32 is highly likely to determine "YES" in STEP S132, similarly in the past determination. As a result, in STEP S150, the CPU 32 tries to transmit a newly generated target file to the relay server 50 again. Therefore, even in a case where the CPU 32 determines that it is necessary to transmit the target file to the relay server 50 but cannot perform transmission of the target file, thereafter, the CPU 32 is highly likely to try transmission of the target file again. For this reason, when the trouble of the relay server 50 is resolved, the CPU 32 can appropriately transmit the target file to the relay server 50.

(Specific Cases)

Subsequently, specific cases which are implemented by the devices 10, 50, 80, and 90 will be described. The printer 10 and the relay server 50 perform the individual processes of FIGS. 5 to 8, whereby the following each case is implemented. Since a process relating to the printer 10 is performed by the CPU 32 of the printer 10, exactly, it is needed to describe that the CPU 32 performs the process. However, hereinafter, in view of ease of understanding, it will be described that the printer 10 performs the process. Similarly, instead of describing that the CPU 62 performs a process, it will be described that the relay server 50 performs a process.

(Case "A" (FIG. 9))

In the initial state of a case "A", the power supply of the printer 10 is in the OFF state. While the power supply of the printer 10 is in the OFF state, the terminal device 80 transmits a SUB command 200 to the relay server 50 in response to an operation of the user. The SUB command 200 includes a printer ID "PR10", a terminal ID "TE80", a data ID "DA1", time information "40 min", and the flag ("ON" or "OFF").

The relay server 50 receives the SUB command 200 from the terminal device 80 ("YES" in STEP S10 of FIG. 5). With reference to the connection state list 70, the relay server 50 determines that a connection state associated with the printer ID "PR10" included in the SUB command 200 is "OFFLINE", ("NO" in STEP S12). Then, the relay server 50 adds a SUB information item 300 (that is, "PR10", "TE80", "DA1", "40 min", and the flag "ON" or "OFF") corresponding to the SUB command 200, to the SUB list 72 (see FIG. 4). In this case, the relay server 50 does not perform a process for transmitting the SUB command to the printer 10 (that is, in a case of "NO" in STEP S12 of FIG. 5, the relay server 50 skips STEP S14).

Thereafter, the power supply of the printer 10 is turned on. In this case, the printer 10 transmits a request signal (that is, an HTTP request) 150 of BOSH (an abbreviation for Bidirectional-streams Over Synchronous HTTP) to the relay server 50. The request signal 150 is a signal for requesting the relay server 50 to transmit a session ID which needs to be used in an XMPP connection.

Not only in a case where the power supply of the printer 10 is switched from the OFF state to the ON state, but also in the following situations, the printer 10 may transmit the request signal 150 to the relay server 50. For example, in a case where the state of the communication link of the printer 10 changes from a link down state to a link up state, the printer 10 may transmit the request signal 150 to the relay server 50. Examples of the link down state can include a state where any cable has not been inserted in the LAN I/F 22, a state where the function of the LAN I/F 22 has been turned off by the user, and so on. Examples of the link up state can include a state where a cable has been inserted in the LAN I/F 22, a state where the function of the LAN I/F 22 has been turned on by the user, and so on. For example, in a case where the communication option of the printer 10 changes from an option to prohibit Internet communications to an option to allow Internet communications, the printer 10 may transmit the request signal 150 to the relay server 50. That is, generally, the printer 10 may transmit the request signal 150 to the relay server 50 in a state where the XMPP connection has been formed.

In a case where the request signal 150 is received from the printer 10, the relay server 50 generates a session ID, and transmits a response signal (an HTTP response) 152 including the session ID, to the printer 10.

In a case where the response signal 152 is received from the relay server 50, the printer 10 transmits the request signal (that is, an HTTP request) 154 of BOSH to the relay server 50. The request signal 154 includes a session ID coinciding with the session ID included in the response signal 152, and a notification for establishing an XMPP connection (that is, a command for requesting establishment of an XMPP connection).

In a case where the request signal 154 including the session ID is received from the printer 10, the relay server 50 transmits a response signal (that is, an HTTP response) 156 representing "OK", to the printer 10. Therefore, the printer 10 and the relay server 50 perform communication of a variety of signals 158 such as an authentication signal for establishing the XMPP connection, and a response signal, thereby establishing the XMPP connection.

In the case where the XMPP connection is formed, the printer 10 transmits a request signal (that is, an HTTP request) 160 of BOSH to the relay server 50. The request signal 160 includes the above described session ID. The request signal 160 is a signal which becomes a cause for transmitting data (for example, a SUB command 210 to be described below) from the relay server 50 to the printer 10.

In a case where the XMPP connection is formed between the printer 10 and the relay server 50 (in STEP S42 in a case of "YES" in STEP S40 of FIG. 6), the relay server 50 determines that the SUB information item 300 including the printer ID "PR10" corresponding to the printer 10 exists in the SUB list 72 ("YES" in STEP S44). For this reason, the relay server 50 generates the SUB command 210 including the information items (that is, "PR10", "TE80", "DA1", and "40 min") included in the SUB information item 300 (in STEP S46). Thereafter, the relay server 50 transmits the SUB command 210, as a response signal (that is, an HTTP response) to the request signal 160, to the printer 10 (in STEP S46). Like this, since the SUB command 210 is transmitted as a response signal to the request signal 160, the SUB command 210 is appropriately transmitted to the printer 10 through the NAT router.

The above described response signal (that is, the SUB command 210) to the request signal 160 does not include the above described session ID. However, since the corresponding response signal is a response signal to the request signal 160 including the above described session ID (that is, the request signal 160 which is transmitted and received by the XMPP connection), it can be said that the corresponding response signal is a signal which is transmitted and received by the XMPP connection. That is, the relay server 50 can transmit the SUB command 210 to the printer 10 by the XMPP connection. The printer 10 can receive the SUB command 210 from the relay server 50 by the XMPP connection. Even in the other description portions of the present embodiment, a case where it is described that an XMPP connection is used means that a command is transmitted and received as a response signal to a request signal of BOSH including a session ID.

As described above, in a case where the SUB command 200 is received from the terminal device 80 in a state where the power supply of the printer 10 is in the OFF state, that is, in a state where the XMPP connection has not been formed between the printer 10 and the relay server 50, the relay server 50 stores the SUB information item 300 in the SUB list 72. For this reason, in a case where the power supply of the printer 10 is turned on, that is, in a case where an XMPP connection is newly formed between the printer 10 and the relay server 50, the relay server 50 can use the SUB information item 300 of the SUB list 72 to appropriately transmit the SUB command 210 to the printer 10.

In a case where the SUB command 210 is received from the relay server 50 ("YES" in STEP S104 of FIG. 7), the printer 10 transmits a target file 220 including the information items (that is, "PR10", "TE80", "DA1", "100 (which is the current value of target data (for example, 100 which is the number of printed media))") included in the SUB command 210, to the relay server 50 (in STEP S106). Further, the printer 10 adds a monitoring information item 310 (that is, "PR10", "TE80", "DA1", "40 min", and for example, "9:40 (which is an estimation time)", and "100 (which is a transmission value)") corresponding to the SUB command 210, to the monitoring table 38 stored in the VRAM 36 (in STEP S108).

(Case "X1" in which Flag is "On")

The relay server 50 receives the target file 220 from the printer 10 ("YES" in STEP S60 of FIG. 6). In a case where the flag included in the SUB information item 300 of the SUB list 72 is "ON" ("YES" in STEP S62), the relay server 50 transmits the target file 220 to the terminal device 80 (in STEP S64). Like this, in a case where the flag is "ON", the relay server 50 can appropriately transmit the target file 220 to the terminal device 80 immediately after receiving the target file 220 from the printer 10.

(Case "X2" in which Flag is "Off")

In a case where the flag included in the SUB information item 300 of the SUB list 72 is "OFF" ("NO" in STEP S62), the relay server 50 does not transmit the target file 220 to the terminal device 80, and describes the current value "100" of the target data of the target file 220, in the SUB information item 300 of the SUB list 72 (in STEP S66).

Thereafter, the terminal device 80 transmits a GET command 250 to the relay server 50 in response to an operation of the user. The GET command 250 includes a printer ID "PR10", a terminal ID "TE80", and a data ID "DA1".

In a case where the GET command 250 is received from the terminal device 80 ("YES" in STEP S30 of FIG. 5), the relay server 50 uses the SUB information item 300 to generate the target file 220 (that is, the target file 220 received from the printer 10). Thereafter, the relay server 50 transmits the target file 220 to the terminal device 80. Like this, in a case where the flag is "OFF", when the GET command 250 is received from the terminal device 80, the relay server 50 can appropriately transmit the target file 220 to the terminal device 80.

(Case "B" (FIG. 10))

In the initial state of a case "B", the power supply of the printer 10 is in the ON state. Therefore, between the printer 10 and the relay server 50, communications of the above described signals 150 to 160 (see FIG. 9) have been already performed, whereby the XMPP connection has been formed. While the power supply of the printer 10 is in the ON state, the terminal device 80 transmits the SUB command 200 to the relay server 50 in response to an operation of the user.

The relay server 50 receives the SUB command 200 from the terminal device 80 ("YES" in STEP S10 of FIG. 5). The relay server 50 determines that a connection state associated with the printer ID "PR10" of the SUB command 200 is "ONLINE" ("YES" in STEP S12), with reference to the connection state list 70, and generates the SUB command 210 including the information items (that is, "PR10", "TE80", "DA1", and "40 min") included in the SUB command 200 (in STEP S14). Then, the relay server 50 transmits the SUB command 210, as a response signal to the above described request signal 160 (see FIG. 9), to the printer 10 (in STEP S14). Thereafter, the relay server 50 adds the SUB information item 300 corresponding to the SUB command 200, to the SUB list 72 (see FIG. 4) (in STEP S16).

In the initial state of the case "B", since the XMPP connection has been formed between the printer 10 and the relay server 50, after a long time elapses from the reception of the above described request signal 160 (see FIG. 9) from the printer 10, the relay server 50 can receive the SUB command 200 from the terminal device 80. Even in this situation, the relay server 50 can appropriately transmit the SUB command 210, as a response signal to the above described request signal 160, to the printer 10. The reason will be described below.

The request signal 160 of BOSH has a timeout time longer than that of a request signal of normal HTTP other than BOSH. Therefore, although a time from when the relay server 50 receives the request signal 160 from the printer 10 to when the relay server 50 transmits the SUB command 210 is long, the relay server 50 can appropriately transmit the SUB command 210 as a response signal to the request signal 160, without determining timeout. In a case where transmission of the request signal 160 of BOSH from the printer 10 to the relay server 50 is performed, although a time from when transmission of the request signal 160 is performed to when the SUB command 210 (that is, a response signal) is received from the relay server 50 is long, the NAT router can appropriately transmit the SUB command 210 to the printer 10 (that is, the NAT router allows transmission of the SUB command 210), without determining timeout.

In a case where the response signal (that is, the SUB command 210) to the request signal 160 is received, the printer 10 transmits the request signal 160 to the relay server 50 again. That is, whenever the response signal to the request signal 160 is received, the printer 10 transmits the request signal 160 to the relay server 50. After the request signal 160 is transmitted to the relay server 50, when a predetermined time period elapses without receiving the response signal from the relay server 50, the printer 10 transmits the request signal 160 to the relay server 50 again. According to this configuration, the relay server 50 always becomes a state where the request signal 160 has been received from the printer 10. For this reason, the relay server 50 can transmit predetermined data (for example, a SUB command), as a response signal to the request signal 160, to the printer 10 at an arbitrary timing. That is, it can be said that a constant connection has been formed between the printer 10 and the relay server 50. The above described predetermined time period is a period shorter than a timeout time corresponding to the above described request signal 160 of BOSH.

Figure 9:
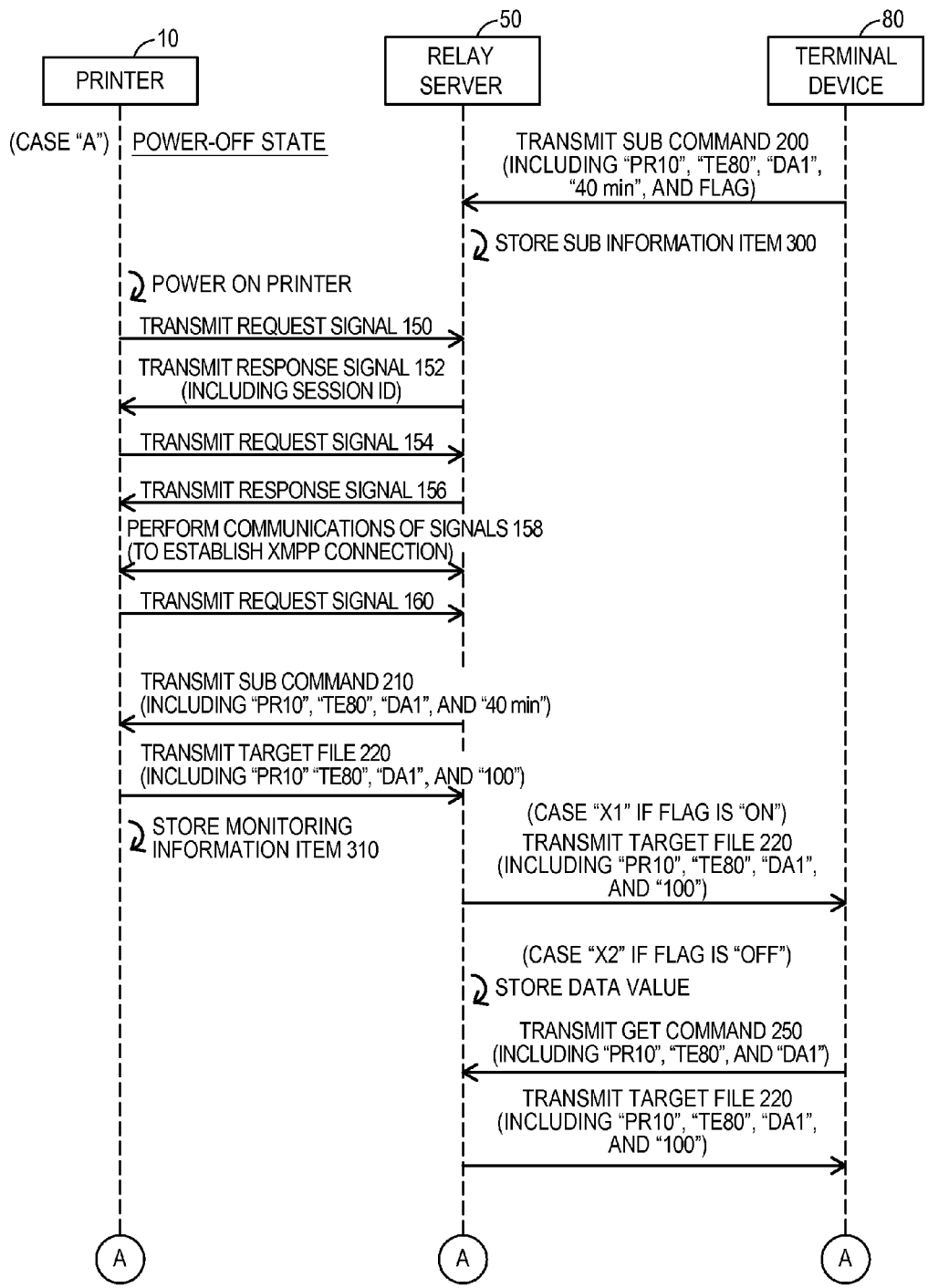
FIG. 9 shows a sequence diagram in a case "A" where the printer is in a power-off state.

After the transmission of the SUB command 210 from the relay server 50 to the printer 10 is performed, the same processes (that is, transmission of the target file 220 to the relay server 50 (in STEP S106 of FIG. 7), and storing of the monitoring information item 310 (in STEP S108)) as those in the case "A" of FIG. 9 are performed by the printer 10. The same processes (that is, transmission of the target file 220 to the terminal device 80 (in STEP S64 of FIG. 6 or the like)) as those in the cases "X1" and "X2" of the case "A" of FIG. 9 are performed by the relay server 50.

Figure 10:
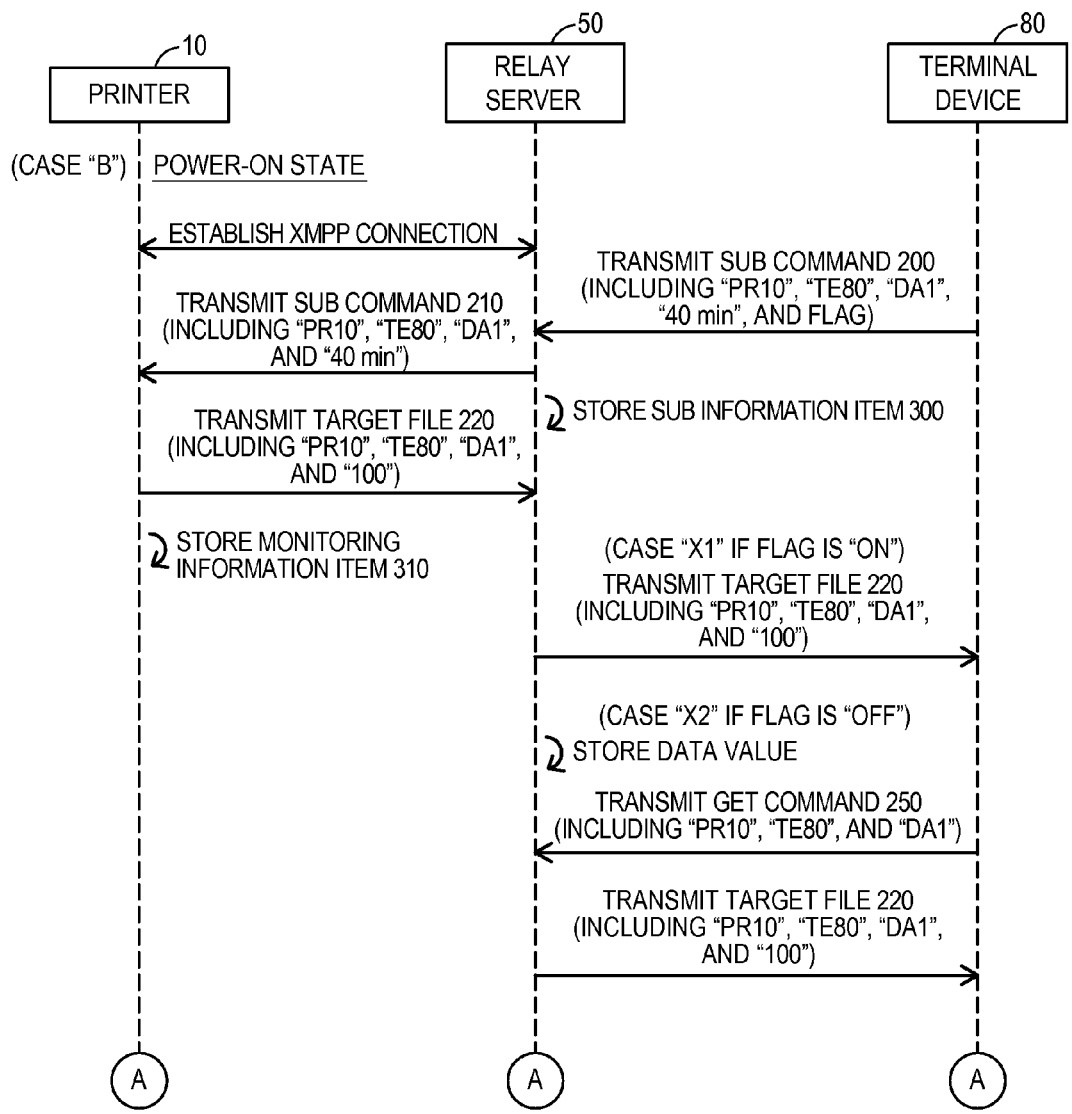
FIG. 10 shows a sequence diagram in a case "B" where the printer is in a power-on state.

(Subsequent Process (FIG. 11) of FIG. 9 or 10)

When undergoing the case "A" of FIG. 9 or the case "B" of FIG. 10, the monitoring table 38 stored in the VRAM 36 of the printer 10 includes the monitoring information item 310, and the SUB list 72 stored in the database 66 of the relay server 50 includes the SUB information item 300. Here, the monitoring information item 310 includes the terminal ID "TE80", the data ID "DA1", the time information "40 min", the estimation time "9:40", and the transmission value "100". The SUB information item 300 includes the printer ID "PR10", the terminal ID "TE80", the data ID "DA1", and the time information "40 min". Although not shown, in the following description, it is assumed that in every SUB information, the flag is "ON".

Figure 8:
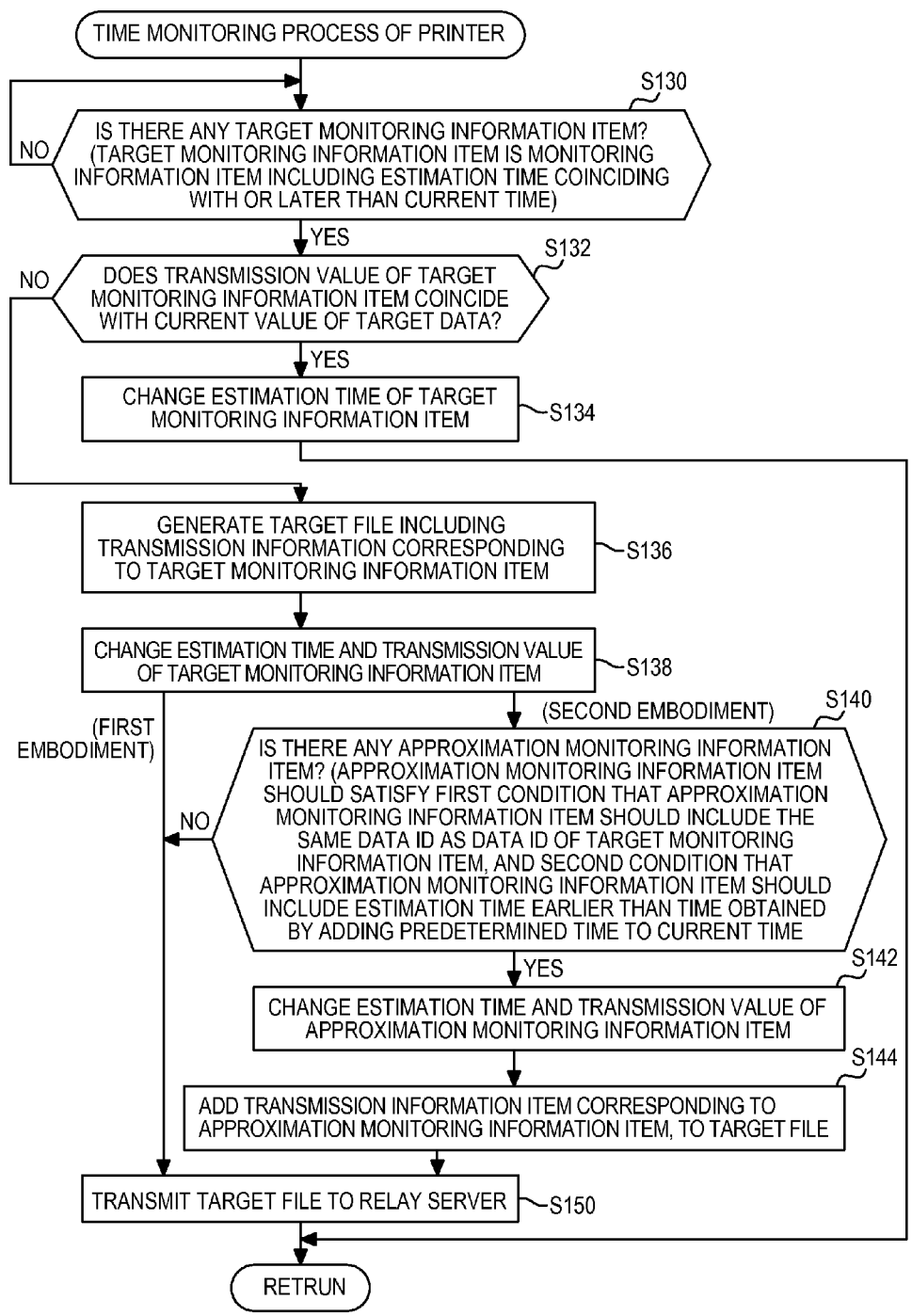
FIG. 8 shows the flow chart of a time monitoring process of the printer.

The printer 10 monitors whether the current time has reached the estimation time "9:40" included in the monitoring information item 310 (in STEP S130 of FIG. 8). When the current time becomes "9:40" ("YES" in STEP S130), the printer 10 determines whether the current value of target data corresponding to the data ID "DA1" (that is, the current value of the target data stored in the NVRAM 35) and the transmission value "100" of the monitoring information item 310 coincide with each other (in STEP S132). Here, since the two values coincide with each other ("YES" in STEP S132), the printer 10 changes the estimation time of the monitoring information item 310 from "9:40" to "10:20" (in STEP S134).

Next, when the current time becomes "10:20" ("YES" in STEP S130), the printer 10 determines whether the current value of the target data and the transmission value "100" of the monitoring information item 310 coincide with each other, again (in STEP S132). Here, since the two values coincide with each other ("YES" in STEP S132), the printer 10 changes the estimation time of the monitoring information item 310 from "10:20" to "11:00" (in STEP S134).

Next, when the current time becomes "11:00"" ("YES" in STEP S130), the printer 10 determines whether the current value of the target data and the transmission value of the monitoring information item 310 coincide with each other, again (in STEP S132). Here, since the two values do not coincide with each other ("NO" in STEP S132), the printer 10 changes the estimation time of the monitoring information item 310 from "11:00" to "11:40", and changes the transmission value of the monitoring information item 310 from "100" to "101 (that is, the current value of the target data)" (in STEP S138). Thereafter, the printer 10 transmits a target file 320 including information items (that is, "TE80" and "DA1") included in the monitoring information item 310, the printer ID "PR10", and the current value "101" of the target data, to the relay server 50 (in STEP S150).

In a case where the target file 320 is received from the printer 10 ("YES" in STEP S60 of FIG. 6), the relay server 50 transmits the target file 320 to the terminal device 80 (in STEP S64 in a case of "YES" in STEP S62).

As described above, whenever the time "40 min" represented by the time information of the monitoring information item 310 elapses, the printer 10 determines whether the current value of the target data and the transmission value of the monitoring information item 310 coincide with each other. Then, only in a case where it is determined that the two values do not coincide with each other, the printer 10 transmits the target file 320 to the relay server 50. That is, in the case where it is determined that the two values coincide with each other, the printer 10 does not transmit any target file to the relay server 50. For this reason, it is possible to reduce the processing load of each of the devices 10, 50, and 80, and it is possible to reduce the load of the network between the individual devices 10, 50, and 80.

Thereafter, the power supply of the printer 10 is turned off. As a result, the XMPP connection between the printer 10 and the relay server 50 is interrupted, and the monitoring information item 310 stored in the VRAM 36 of the printer 10 is deleted.

Next, the power supply of the printer 10 is turned on again. In this case, the printer 10 transmits a request signal (refer to the request signal 154 of FIG. 9) including a notification for establishing an XMPP connection, to the relay server 50 (in STEP S100 of FIG. 7). As a result, between the printer 10 and the relay server 50, the XMPP connection is formed again.

In the case where the XMPP connection is formed again ("YES" in STEP S40 of FIG. 6), the relay server 50 uses the SUB information item 300 to transmit a SUB command 350 to the printer 10 (in STEP S46). Information items (that is, "PR10", "TE80", "DA1", and "40 min") which are included in the SUB command 350 are the same as the information items which are included in the SUB command 210 of FIG. 9 or 10.

In a case where the SUB command 350 is received from the relay server 50 ("YES" in STEP S104 of FIG. 7), the printer 10 transmits a target file 360 to the relay server 50 (in STEP S106). The current value "102" of the target data which is included in the target file 360 is different from the current value "101" of the target data which is included in the target file 320. The reason is that after the transmission of the target file 320 from the printer 10 to the relay server 50 was performed, in the printer 10, the value of the target data (for example, the number of printed media) changed before the power supply of the printer 10 was turned off. Further, the printer 10 adds a monitoring information item 310 corresponding to the SUB command 350, to the monitoring table 38 stored in the VRAM 36 (in STEP S108).

In a case where the target file 360 is received from the printer 10 ("YES" in STEP S60 of FIG. 6), the relay server 50 transmits the target file 360 to the terminal device 80 (in STEP S64 in a case of "YES" in STEP S62).

As described above, since the SUB information item 300 has been stored in the SUB list 72 (see FIG. 4) stored in the database 66, in a case where the power supply of the printer 10 is turned on, that is, in a case where the XMPP connection is formed between the printer 10 and the relay server 50, the relay server 50 can use the SUB information item 300 to transmit the SUB command 350 to the printer 10 again. Therefore, the printer 10 can add the monitoring information item 310 to the monitoring table 38 stored in the VRAM 36, again. As a result, the printer 10 can appropriately transmit the target file to the terminal device 80 through the relay server 50 according to the monitoring information item 310.

Since the printer 10 has the NVRAM 35, it can be considered to use a configuration (hereinafter, referred to as the configuration of a comparative example) in which the printer 10 stores the monitoring information item 310 in the NVRAM 35, not in the VRAM 36. However, when the configuration of the comparative example is used, the printer 10 needs to secure a storage area for storing the monitoring information item in the NVRAM 35. For this reason, in the configuration of the comparative example, the capacity of the NVRAM 35 of the printer 10 inevitably becomes large. Since NVRAMs are generally more expensive than VRAMs, the manufacturing cost of the printer 10 can become high.

In view of these circumstances, in the present embodiment, the configuration in which the monitoring information item 310 (that is, the monitoring table 38) is stored in the VRAM 36 (that is, a configuration in which the monitoring information item 310 is not stored in the NVRAM 35) is used to suppress the capacity of the NVRAM 35 from increasing. As a result, it is possible to reduce the manufacturing cost of the printer 10 as compared to the configuration of the comparative example. However, according to the present embodiment, since the configuration in which the printer 10 stores the monitoring information item 310 (that is, the monitoring table 38) in the VRAM 36 is used, when the printer 10 is powered off, the monitoring information item 310 is deleted from the VRAM 36. In view of occurrence of this situation, the relay server 50 stores the SUB information item 300 in the SUB list 72 stored in the database 66. Therefore, even if the monitoring information item 310 is deleted from the printer 10, the relay server 50 can transmit the SUB command corresponding to the SUB information item 300, to the printer 10, again, such that the printer 10 stores the monitoring information item 310 again.

Figure 11:
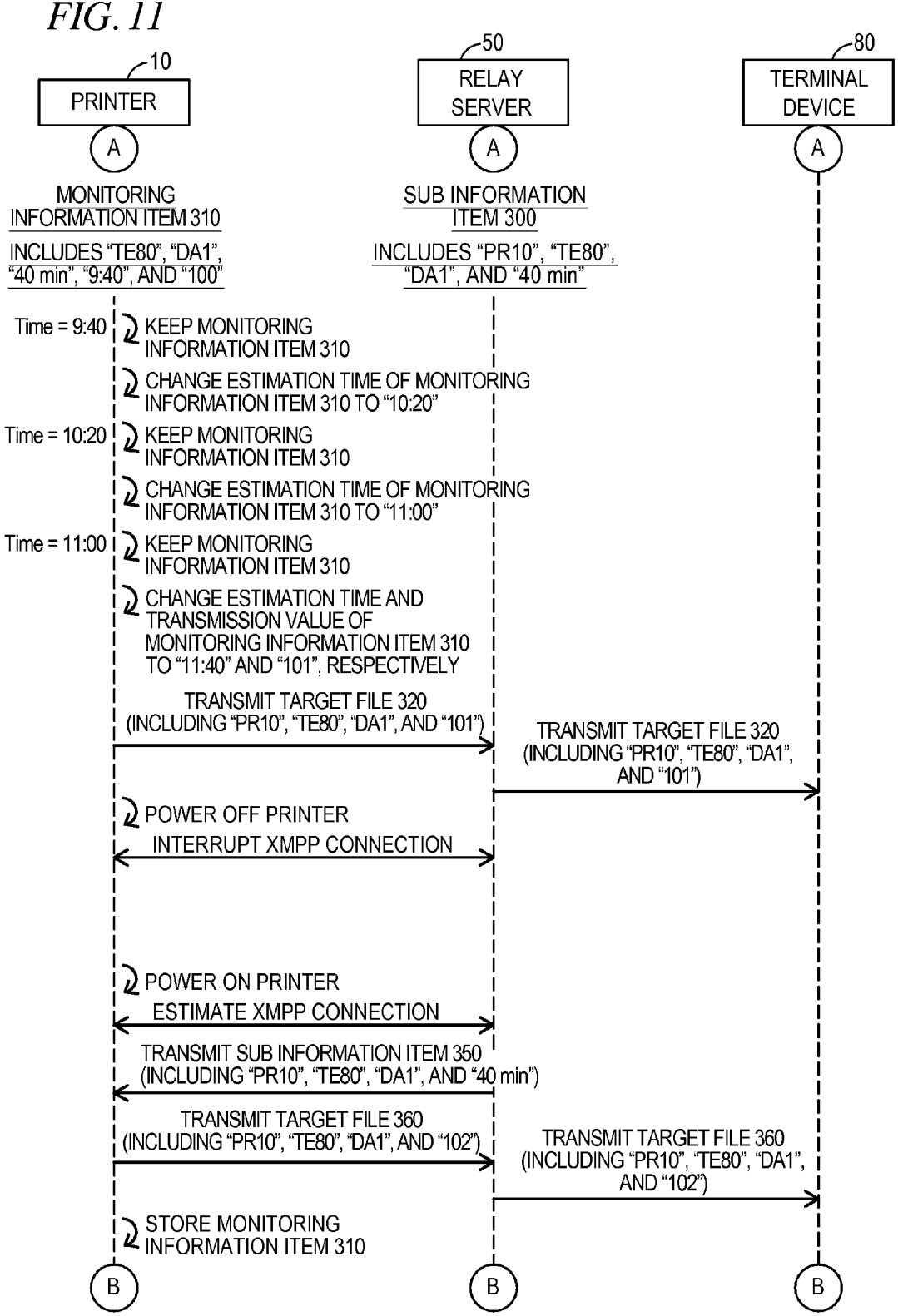
FIG. 11 shows the subsequent sequence diagram of FIG. 9 or 10.
Figure 12:
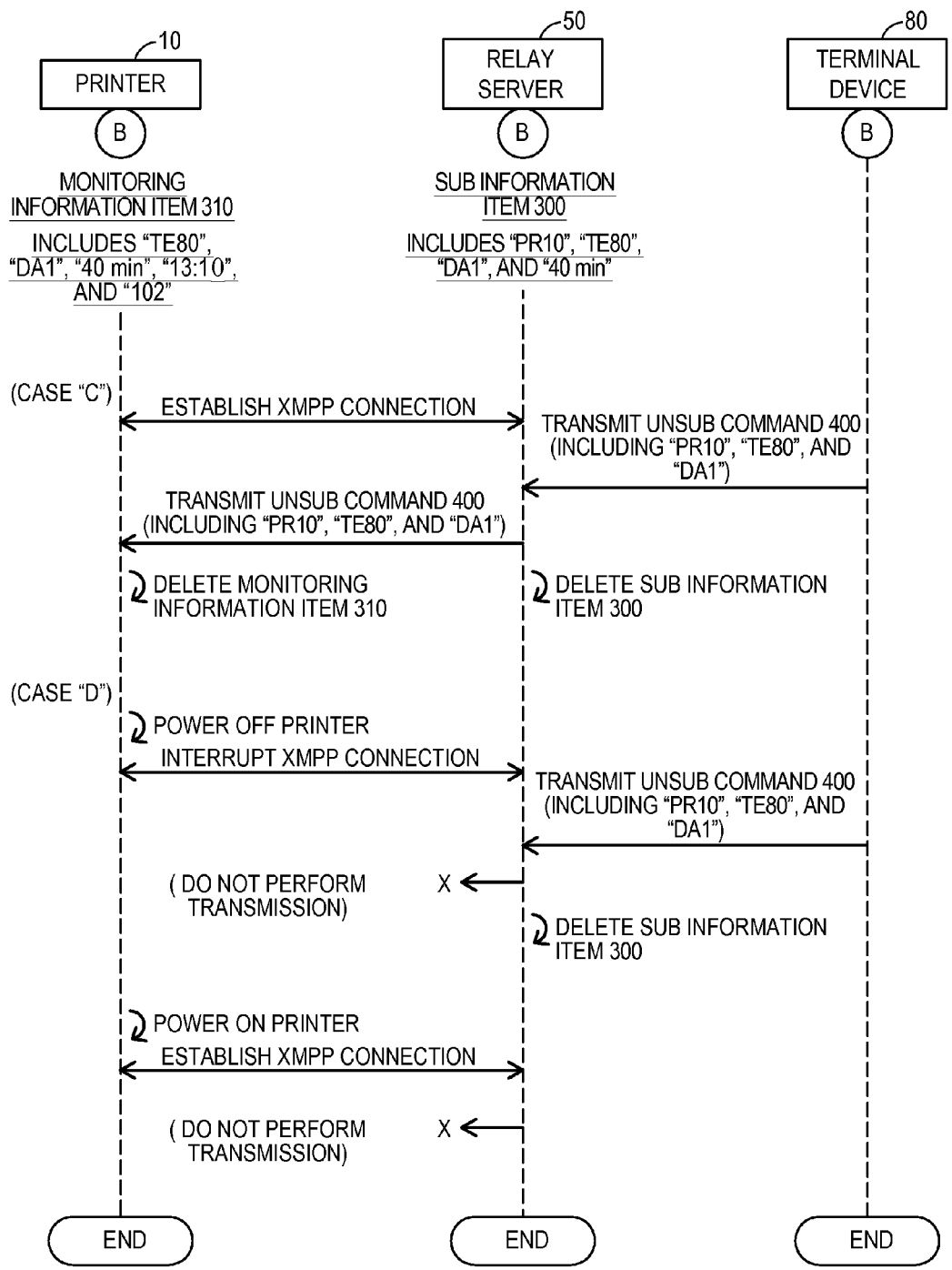
FIG. 12 shows the subsequent sequence diagram of FIG. 11.

(Subsequent Process (FIG. 12) of FIG. 11)

When undergoing the sequence of FIG. 11, the monitoring table 38 stored in the VRAM 36 of the printer 10 includes the monitoring information item 310, and the SUB list 72 stored in the database 66 of the relay server 50 includes the SUB information item 300.

(Case "C")

The terminal device 80 transmits an UNSUB command 400 to the relay server 50 in response to an operation of the user. In a case "C", while the power supply of the printer 10 is in the ON state, the UNSUB command 400 is transmitted from the terminal device 80 to the relay server 50. The UNSUB command 400 includes a printer ID "PR10", a terminal ID "TE80", and a data ID "DA1".

The relay server 50 receives the UNSUB command 400 from the terminal device 80 ("YES" in STEP S20 of FIG. 5). The relay server 50 determines that a connection state associated with the printer ID "PR10" included in the UNSUB command 400 is "ONLINE" ("YES" in STEP S22), with reference to the connection state list 70, and transmits the UNSUB command 400 to the printer 10 (in STEP S24). Thereafter, the relay server 50 deletes the SUB information item 300 from the SUB list 72 stored in the database 66.

In a case where the UNSUB command 400 is received from the relay server 50 ("YES" in STEP S120 of FIG. 7), the printer 10 deletes the monitoring information item 310 corresponding to the UNSUB command 400, from the monitoring table 38 stored in the VRAM 36 (in STEP S122).

(Case "D")

In a case "D", after the power supply of the printer 10 is turned off, the UNSUB command 400 is transmitted from the terminal device 80 to the relay server 50. When the power supply of the printer 10 is turned off, the XMPP connection between the printer 10 and the relay server 50 is interrupted, and the monitoring information item 310 stored in the VRAM 36 of the printer 10 is deleted.

In a case where the UNSUB command 400 is received from the terminal device 80 ("YES" in STEP S20 of FIG. 5), the relay server 50 determines that the connection state associated with the printer ID "PR10" included in the UNSUB command 400 is "OFFLINE" ("NO" in STEP S22), with reference to the connection state list 70. In this case, the relay server 50 does not perform any process for transmitting the UNSUB command 400 to the printer 10, and deletes the SUB information item 300 from the SUB list 72 stored in the database 66.

Thereafter, the power supply of the printer 10 is turned on again. In this case, between the printer 10 and the relay server 50, an XMPP connection is formed. However, since the relay server 50 has already deleted the SUB information item 300 from the SUB list 72 stored in the database 66, the relay server 50 determines that there is no SUB information item including the printer ID "PR10" ("NO" in STEP S44 of FIG. 6). As a result, the relay server 50 does not transmit any SUB command to the printer 10. The relay server 50 does not the UNSUB command 400 to the printer 10. The reason is that the monitoring information item 310 has been already deleted from the printer 10. Therefore, it is possible to suppress any unnecessary command from being transmitted from the relay server 50 to the printer 10. As a result, it is possible to reduce the processing loads of the printer 10 and the relay server 50, and it is possible to reduce the load of the network between the printer 10 and the relay server 50.

(Subsequent Process (FIG. 13) of FIG. 11)

When undergoing the sequence of FIG. 11, the monitoring table 38 stored in the VRAM 36 of the printer 10 includes the monitoring information item 310, and the SUB list 72 stored in the database 66 of the relay server 50 includes the SUB information item 300.

The terminal device 90 different from the terminal device 80 transmits a SUB command 500 to the relay server 50 in response to an operation of the user. The SUB command 500 includes a printer ID "PR10", a terminal ID "TE90", a data ID "DA3", time information "20 min", and the flag "ON".

In a case where the SUB command 500 is received from the terminal device 90 ("YES" in STEP S10 of FIG. 5), the relay server 50 transmits a SUB command 510 including the information items (that is, "PR10", "TE90", "DA3", and "20 min") included in the SUB command 500, to the printer 10 (in STEP S14). Thereafter, the relay server 50 adds a SUB information item 600 corresponding to the SUB command 500, to the SUB list 72 (see FIG. 4) (in STEP S16). As a result, the SUB list 72 includes two SUB information items 300 and 600.

In a case where the SUB command 510 is received from the relay server 50 ("YES" in STEP S104 of FIG. 7), the printer 10 transmits a target file 520 including information items (that is, "PR10", "TE90", and "DA3") included in the SUB command 210, and the current value "80 (which means, for example, that the residual amount of toner is 80%)" of target data corresponding to the data ID "DA3", to the relay server 50 (in STEP S106). Further, the printer 10 adds a monitoring information item 610 corresponding to the SUB command 510, to the monitoring table 38 stored in the VRAM 36 (in STEP S108). As a result, the monitoring table 38 includes the two monitoring information items 310 and 610.

In a case where the target file 520 is received from the printer 10 ("YES" in STEP S60 of FIG. 6), the relay server 50 transmits the target file 520 to the terminal device 90 (in STEP S64).

Thereafter, the power supply of the printer 10 is turned off. As a result, the XMPP connection between the printer 10 and the relay server 50 is interrupted, and the two monitoring information items 310 and 610 stored in the VRAM 36 of the printer 10 are deleted.

Next, the power supply of the printer 10 is turned on again. In this case, between the printer 10 and the relay server 50, an XMPP connection is formed. Then, the relay server 50 uses the two SUB information items 300 and 600 including the printer ID "PR10" corresponding to the printer 10, to sequentially transmit two SUB commands 550 and 552 to the printer 10 (in STEP S46). The SUB command 550 includes information items coinciding with the information items included in the SUB command 210 (see FIG. 9) or the SUB command 350 (see FIG. 11). The SUB command 552 includes information items coinciding with the information items included in the SUB command 510.

In a case where the two SUB commands 550 and 552 are sequentially received from the relay server 50 ("YES" in STEP S104 of FIG. 7), the printer 10 sequentially transmits two target files 560 and 562 to the relay server 50 (in STEP S106). Further, the printer 10 adds the two monitoring information items 310 and 610 corresponding to the two SUB commands 550 and 552, to the monitoring table 38 stored in the VRAM 36 (in STEP S108).

In a case where the two target files 560 and 562 are sequentially received from the printer 10 ("YES" in STEP S60 of FIG. 6), the relay server 50 transmits the target file 560 to the terminal device 80 (in STEP S64), and transmits the target file 562 to the terminal device 90 (in STEP S64).

(Specific Example (FIG. 14) of Time Monitoring Process (FIG. 8))

Figure 14:
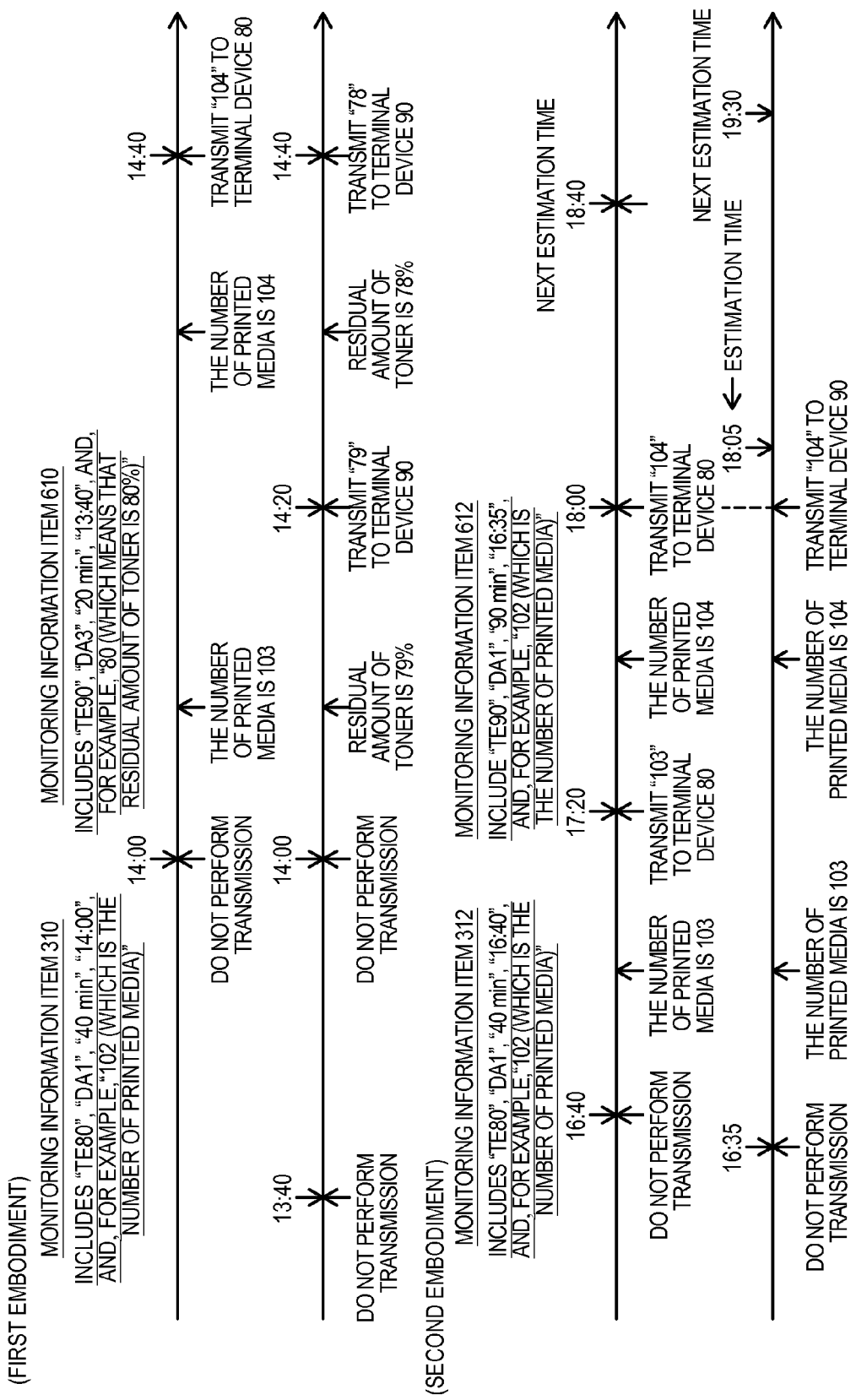
FIG. 14 shows a time chart illustrating how the printer transmits target data.

As shown in FIG. 14, the printer 10 has the two monitoring information items 310 and 610 stored therein. The data ID "DA1" included in the monitoring information item 310 corresponds to the number of printed media, and the data ID "DA3" included in the monitoring information item 610 corresponds to the residual amount of toner. In a first embodiment of FIG. 14, the upper time chart and the lower time chart show time charts corresponding to the monitoring information item 310 and the monitoring information item 610, respectively.

According to the monitoring information item 310, whenever 40 minutes goes by, the printer 10 performs a determining process (STEP S132 of FIG. 8) on whether there is any change in the number of printed media. That is, the printer 10 performs the determining process at 14:00 and at 14:40. In the determining process at 14:00, the printer 10 determines that there is no change ("NO" in STEP S132). Therefore, the printer 10 does not transmit a target file including the current value "102" of the number of printed media, to the relay server 50.

Between 14:00 and 14:40, the number of printed media changes from "102" to "104" through "103". Therefore, in the determining process at 14:40, the printer 10 determines that there is a change ("YES" in STEP S132). Therefore, the printer 10 transmits a target file including the current value "104" of the number of printed media, to the terminal device 80 through the relay server 50 (in STEP S150). The printer 10 does not transmit the target file at a timing when the number of printed media changes (for example, a timing when the number of printed media changes from "102" to "103") but transmits the target file after the determining process is performed at 14:40. For this reason, according to the present embodiment, as compared to a configuration in which a target file is transmitted whenever the number of printed media changes, it is possible to reduce the number of times a target file is transmitted from the printer 10 to the relay server 50, and as a result, it is possible to reduce the processing loads of the individual devices 10, 50, and 80, and the load of the network between the individual devices 10, 50, and 80.

According to the monitoring information item 610, whenever 20 minutes goes by, the printer 10 performs a determining process (STEP S132 of FIG. 8) on whether there is any change in the residual amount of toner. That is, the printer 10 performs the determining process at 13:40, 14:00, 14:20, and 14:40. In the determining process at 13:40, and the determining process at 14:00, the printer 10 determines that there is no change ("NO" in STEP S132). Therefore, the printer 10 does not transmit a target file including the current value "80" of the residual amount of toner, to the relay server 50.

Between 14:00 and 14:20, the residual amount of toner changes from "80" to "79". Therefore, in the determining process at 14:20, the printer 10 determines that there is a change ("YES" in STEP S132). Therefore, the printer 10 transmits a target file including the current value "79" of the residual amount of toner, to the terminal device 90 through the relay server 50 (in STEP S150). Between 14:20 and 14:40, the residual amount of toner changes from "79" to "78". Therefore, in the determining process at 14:40, the printer 10 determines that there is a change ("YES" in STEP S132). Therefore, the printer 10 transmits a target file including the current value "78" of the residual amount of toner, to the terminal device 90 through the relay server 50.

As described above, according to the present embodiment, the printer 10 can perform the determining process at appropriate intervals according to each of the plurality of monitoring information items 310 and 610, and transmit target files to the terminal device 80 or 90 at appropriate timings.

(Correspondence Relation)

Figure 13:
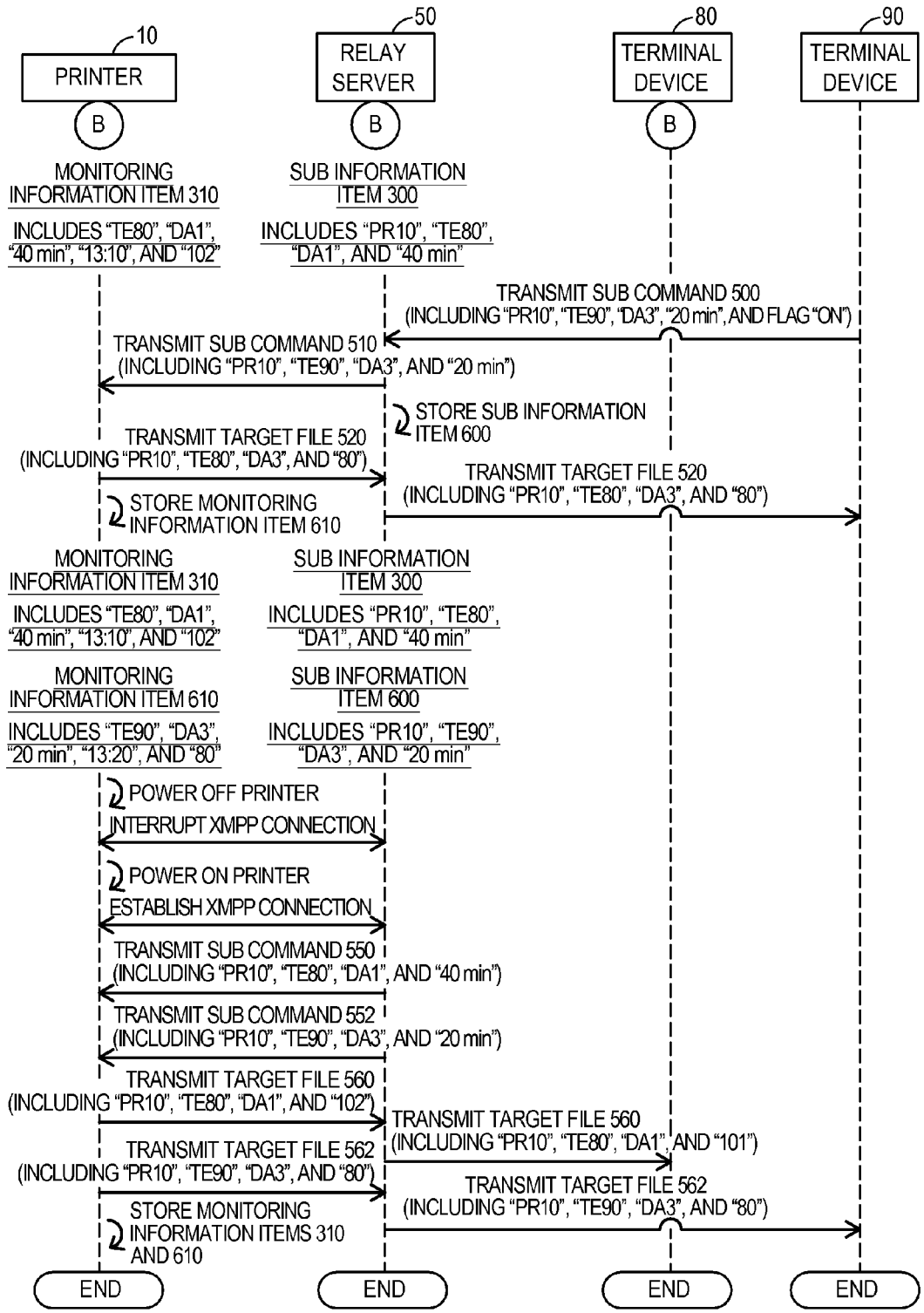
FIG. 13 shows the subsequent sequence diagram of FIG. 12.

The terminal device 80, the terminal device 90, and the printer 10 are examples of a first terminal device, a second terminal device, and a communication apparatus, respectively. The relay server 50, the terminal device 80, and the terminal device 90 are examples of a management system. The information items (that is, "PR10", "TE80", "DA1", and "40 min") which are included in the SUB command 200 of FIG. 9 or FIG. 10, and the information items (that is, "PR10", "TE90", "DA3", and "20 min") which are included in the SUB command 500 of FIG. 13 are examples of a first condition information item and a second condition information item, respectively.

In FIG. 14, the number of printed media, the data ID "DA1", and the time information "40 min" are examples of first target data, first data identification information, and first time information, respectively. The residual amount of toner, the data ID "DA3", and the time information "20 min" are examples of second target data, second data identification information, and second time information, respectively. An XMPP connection is an example of a specific connection. The request signal 150, the response signal 152, and the request signal 154 shown in FIG. 9 are examples of a first request signal, a response signal, and a second request signal, respectively.

Figure 7:
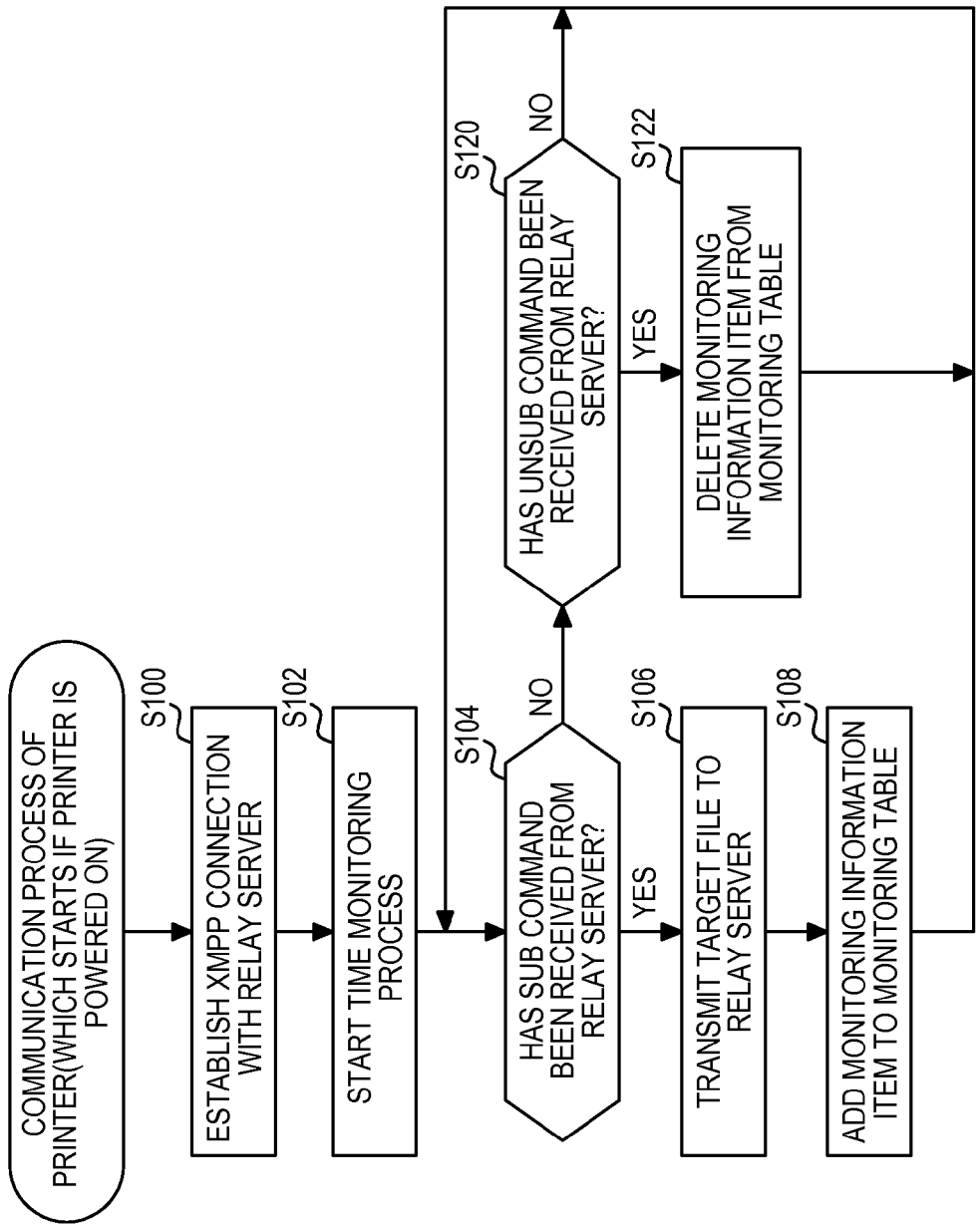
FIG. 7 shows the flow chart of a communication process of the printer.

The processes of STEPS S104 and S108 of FIG. 7 and the processes of STEPS S132 and S152 of FIG. 8 are examples of processes which are performed by a condition information receiving unit, a memory control unit, a first determining unit, and a target data transmitting unit, respectively. Processes of FIG. 9, that is, the process of transmitting the request signal 150, the process of receiving the response signal 152, the process of transmitting the request signal 154, and the process of performing communications of the signals 158 are examples of processes which are performed by a signal receiving unit, a signal transmitting unit, a notification receiving unit, and an establishing unit, respectively.

(Second Embodiment)

Differences from the first embodiment will be described. In the present embodiment, the contents of a time monitoring process (that is, a time monitoring process which is started in STEP S102 of FIG. 7) which is performed by the printer 10 are different. More specifically, in the present embodiment, as shown in FIG. 8, subsequently to STEP S138, the processes of STEPS S140 to S144 are performed.

In STEP S140, the CPU 32 of the printer 10 determines whether there is any approximation monitoring information item in the monitoring table 38 (see FIG. 1). An approximation monitoring information item is a monitoring information item satisfying the following first and second conditions. The first condition is a condition that an approximation monitoring information item should include the same data ID as a data ID included in a corresponding target monitoring information item. The second condition is a condition that an approximation monitoring information item should include an estimation time earlier than a time obtained by adding a predetermined time (for example, 10 minutes) to the current time (that is, an estimation time included in a corresponding target monitoring information item).

For example, it is assumed a situation in which the first (uppermost) monitoring information item in the monitoring table 38 of FIG. 2 is a target monitoring information item. In this case, since the second monitoring information item and the fourth monitoring information item each include a data ID "DA2" or "DA3" different from a data ID "DA1" which is included in the target monitoring information item (that is, the first monitoring information item), the second monitoring information item and the fourth monitoring information item do not satisfy the above described first condition, and thus are not approximation monitoring information items. However, the third monitoring information item includes the same data ID "DA1" as the data ID "DA1" included in the target monitoring information item (that is, the first monitoring information item), and thus satisfies the above described first condition. Further, the third monitoring information item includes an estimation time "9:45" earlier than a time "9:50" obtained by adding the predetermined time (that is, 10 minutes) to the current time (that is, an estimation time "9:40" included in the target monitoring information item), and thus satisfies the above described second condition. Therefore, in a case where the first monitoring information item is a target monitoring information item, the third monitoring information satisfies the above described first and second conditions, and thus is an approximation monitoring information item.

In a case where there is an approximation monitoring information item ("YES" in STEP S140), the CPU 32 proceeds to STEP S142. Meanwhile, in a case where there is no approximation monitoring information item ("NO" in STEP S140), the CPU 32 proceeds to STEP S150 (that is, the CPU 32 skips STEPS S142 and S144).

In STEP S142, the CPU 32 adds a time represented by the time information of the approximation monitoring information item, to the current time, thereby calculating a new estimation time. Thereafter, the CPU 32 describes the calculated new estimation time in an estimation time section of the approximation monitoring information item. Further, the CPU 32 describes the current value of target data in a transmission value section of the approximation monitoring information item.

Next, in STEP S144, the CPU 32 generates a transmission information item corresponding to the approximation monitoring information item. Specifically, the CPU 32 generates a transmission information item including information items (that is, a terminal ID and a data ID) included in the approximation monitoring information item, a printer ID "PR10" corresponding to the printer 10, and the current value of target data corresponding to the data ID of the approximation monitoring information item. Thereafter, the CPU 32 adds the transmission information item to the target file generated in STEP S136. Therefore, the target file including two or more transmission information items is generated. Subsequently, in STEP S150, the CPU 32 transmits the generated target file to the relay server 50.

In a case where the target file is received from the printer 10 ("YES" in STEP S60 of FIG. 6), the CPU 62 of the relay server 50 transmits a target file to a terminal device according to each of the two or more transmission information items included in the target file. For example, it is assumed a situation in which the target file includes a first transmission information item (including "TE80", "DA1", "PR10", and "100 (which is the current value of target data)"), and a second transmission information item (including "TE90", "DA1", "PR10", and "100 (which is the current value of target data)"). In this case, the CPU 62 transmits a target file including the first transmission information item, to the terminal device 80 (in STEP S64), and transmits a target file including the second transmission information item, to the terminal device 90 (in STEP S64).

(Specific Example (FIG. 14) of Time Monitoring Process (FIG. 8))

As shown in FIG. 14, the printer 10 has two monitoring information items 312 and 612 stored therein. The data ID "DA1" included in the monitoring information item 312, and the data ID "DA1" included in the monitoring information item 612 are the same (that is, they each correspond to the number of printed media). In a second embodiment of FIG. 14, the upper time chart and the lower time chart show time charts corresponding to the monitoring information item 312 and the monitoring information item 612, respectively.

According to the monitoring information item 312, whenever 40 minutes goes by, the printer 10 performs a determining process (STEP S132 of FIG. 8) on whether there is any change in the number of printed media. According to the monitoring information item 612, whenever 90 minutes goes by, the printer 10 performs a determining process (STEP S132 of FIG. 8) on whether there is any change in the number of printed media.

In the determining process at 16:35 corresponding to the monitoring information item 612 and the determining process at 16:40 corresponding to the monitoring information item 312, the printer 10 determines that there is no change ("NO" in STEP S132). Therefore, the printer 10 does not transmit any target file including the current value "102" of the number of printed media, to the relay server 50.

Between 16:40 and 17:20, the number of printed media changes from "102" to "103". Therefore, in the determining process at 17:20 corresponding to the monitoring information item 312, the printer 10 determines that there is a change ("YES" in STEP S132). Therefore, a difference between the estimation time (that is, 18:50) of the determining process corresponding to the monitoring information item 612, and the current time (that is, 17:20) is larger than the above described predetermined time (that is, 10 minutes). For this reason, the monitoring information item 612 satisfies the above described first condition, but does not satisfy the above described second condition. Therefore, the monitoring information item 612 is not an approximation monitoring information item.

Therefore, the printer 10 determines that there is no approximation monitoring information item ("NO" in STEP S140), the printer 10 transmits a target file including the current value "103" of the number of printed media, only to the terminal device 80, through the relay server 50 (in STEP S150).

Between 17:20 and 18:00, the number of printed media changes from "103" to "104". Therefore, in the determining process at 18:00 corresponding to the monitoring information item 312, the printer 10 determines that there is a change ("YES" in STEP S132). Therefore, a difference between the estimation time (that is, 18:05) of the determining process corresponding to the monitoring information item 612, and the current time (that is, 18:00) is smaller than the above described predetermined time (that is, 10 minutes). For this reason, the monitoring information item 612 satisfies both of the above described first and second conditions, and thus is an approximation monitoring information item.

Therefore, the printer 10 determines that there is an approximation monitoring information item ("YES" in STEP S140), and transmits target files, which include a first transmission information item including the current value "103" of the number of printed media and the terminal ID "TE80" of the terminal device 80, and a second transmission information item including the current value "103" of the number of printed media and the terminal ID "TE90" of the terminal device 90, to the relay server 50. Therefore, the printer 10 can transmit the current value "103" of the number of printed media to each of the terminal devices 80 and 90 through the relay server 50.

The printer 10 describes a new estimation time "19:30" obtained by adding 90 minutes to the current time "18:00", as the estimation time of the monitoring information item 612 which is an approximation monitoring information item (in STEP S142). That is, the printer 10 changes the estimation time at which the determining process corresponding to the monitoring information item 612 needs to be performed, from "18:05" to "19:30". Therefore, even after 18:05, the printer 10 does not transmit the determining process corresponding to the monitoring information item 612 (that is, the printer 10 does not transmit the current value of the number of printed media).

As described above, in the present embodiment, in a case where there is an approximation monitoring information item (that is, the monitoring information item 612) including an estimation time close to the estimation time of the target monitoring information item (that is, the monitoring information item 312), the printer 10 can transmit the current value "103" of the number of printed media to each of the terminal devices 80 and 90 through the relay server 50. Therefore, the printer 10 can simultaneously perform a process for transmitting the current value "103" of the number of printed media to the terminal device 80, and a process for transmitting the current value "103" of the number of printed media to the terminal device 90. As a result, it is possible to reduce the processing load of the printer 10.

Although specific examples of the present invention have been described in detail, they are merely illustrative and do not limit the scope of claims. In technologies to be described in claims, examples obtained by changing or modifying the above described specific examples are included. Modifications of the above described embodiments will be listed below.

(First Modification)

In the above described embodiments, one relay server 50 relays communications (for example, SUB commands and target files) between the printer 10 or 40 and the terminal device 80 or 90. Instead of this, for example, two or more servers separately configured may relay communications (for example, SUB commands and target files) between the printer 10 or 40 and the terminal device 80 or 90. For example, in a case where a first server receives a SUB command from the terminal device 80, the first server may transmit the SUB command to a second server. In a case where the second server receives the SUB command from the first server, the second server may transmit the SUB command to the printer 10 or 40. In general, a relay server may be configured only by one server, or may be configured by two or more servers configured separately.

(Second Modification)

In the above described embodiments, the printer 10 transmits a target file to the terminal device 80 or 90 through the relay server 50 (in STEP S106 of FIG. 7 or STEP S150 of FIG. 8). Instead of this, the printer 10 may transmit a target file directly to the terminal device 80 or 90, not through the relay server 50. That is, in general, the printer 10 needs only to transmit target data to the outside such that a target file is received by the terminal device 80 or 90.

(Third Modification)

The condition information item may be a Subscribe command of HTTP, or may be other information (for example, a command of a protocol other than HTTP) representing a condition for transmission of data from the printer 10 or 40 to the terminal device 80 or 90. Generally, the condition information item needs only to be information representing a condition for transmission of data from the communication apparatus to a terminal device, and include data identification information and time information.

(Fourth Modification)

The printer 10 or 40, and the relay server 50 may not establish a constant connection like an XMPP connection. Instead of that, for example, the printer 10 or 40 may regularly transmit a request signal of normal HTTP other than BOSH, to the relay server 50. In a case where there is any data (for example, a SUB command) which needs to be transmitted to the printer 10 or 40, the relay server 50 may transmit the corresponding data, as a response signal to the request signal, to the printer 10 or 40. Even in this configuration, the relay server 50 can appropriately transmit data to the printer 10 or 40 through the NAT router. Generally, it is not necessarily needed to use a configuration in which the specific connection is formed between the relay server and the communication apparatus.

(Fifth Modification)

In the above described fourth modification, for example, in a case where the power supply of the printer 10 is turned on, the printer 10 may transmit a notification representing that the printer 10 is in the power-on state, to the relay server 50. In a case where the notification representing that the printer 10 is in the power-on state is received from the printer 10, the relay server 50 may transmit the SUB command to the printer 10 again.

(Sixth Modification)

In the above described each embodiment, when the power supply of the printer 10 is turned on, the CPU 32 of the printer 10 starts the communication process of FIG. 7. Instead of this, in a case where the state of the communication link of the printer 10 changes from the link down state to the link up state, the CPU 32 may start the communication process of FIG. 7. Examples of the link down state and the link up state have been already described with respect to the above described first embodiment.

In a case where the above described configuration is used, the CPU 62 of the relay server 50 may operate as follows. That is, it is assumed a situation in which while a target printer (for example, the printer 10) is in the link down state (only while the power supply of the target printer is in the ON state), the CPU 62 receives an UNSUB command which needs to be transmitted to the target printer. In this situation, between the target printer and the relay server 50, an XMPP connection has not been formed. However, since the power supply of the target printer is kept in the ON state, a corresponding monitoring information item is retained in the VRAM of the target printer. Therefore, in a case where an XMPP connection is formed between the target printer and the relay server 50, the CPU 62 may transmit the above described UNSUB command to the target printer. According to this configuration, in a case where the XMPP connection is formed, the target printer can receive the UNSUB command from the relay server 50 and appropriately delete the monitoring information item from the VRAM.

(Seventh Modification)

The communication apparatus is not limited to the printer 10 and the like, and may be a scanner, a copy machine, a multi-function apparatus, a portable terminal, a PC, a server, or the like. A terminal device may not be set at a shop of the printer 10 or the like, and may be, for example, a household PC, or the like.

(Eighth Modification)

In the above described embodiments, the CPU 62 of the relay server 50 executes the programs (that is, software) stored in the memory 64, whereby the individual processes of FIGS. 5 and 6 are implemented. Also, the CPU 32 of the printer 10 executes the programs (that is, software) stored in the memory 34, whereby the individual processes of FIGS. 7 and 8 are implemented. Instead of this, at least one process of the individual processes of FIGS. 5 to 8 may be implemented by hardware such as a logic circuit.

Also, the technical elements explained in this specification or shown in the drawings provide technical utility either independently or through various combinations. The present invention is not limited to the combinations described in the claims at the filing time of this specification. Further, each technology exemplified in this specification or the drawings achieves multiple objectives simultaneously, and has technical utility by achieving any one of those objectives.

What is claimed is:

1. A communication apparatus configured to communicate with a management system, the communication apparatus comprising:
   at least one processor; and
   at least one memory storing computer readable instructions that, when executed by the at least one processor, cause the communication apparatus to:
   store at least one condition information in the at least one memory, each of the at least one condition information representing a condition to transmit data from the communication apparatus to the management system, each of the at least one condition information including data identification information to identify target data which is an object of transmission, and time information representing a target time which is a time corresponding to a transmission timing of the target data;
   perform a determining process corresponding to each of the at least one condition information stored in the memory, the determining process being performed every time the target time represented by the time information elapses, and the determining process being a process of determining whether a value of the target data represented by the data identification information changes between a previous target time and a current target time;
   transmit the value of the target data to the management system when it is determined in the determining process that the value of the target data changes; and
   not transmit the value of the target data to the management system when it is determined in the determining process that the value of the target data does not change.

2. The communication apparatus according to claim 1, wherein:
   the at least one condition information includes first condition information and second condition information,
   the first condition information includes first data identification information to identify first target data, and first time information representing a first target time, and
   the second condition information includes second data identification information to identify second target data, and second time information representing a second target time different from the first target time.

3. The communication apparatus according to claim 2, wherein:
   the management system is configured to include a first terminal device, and a second terminal device different from the first terminal device, and
   the instructions, when executed by the at least one processor, cause the communication apparatus to:
   receive the first condition information from the first terminal device;
   receive the second condition information from the second terminal device;
   store the first condition information in the at least one memory when the communication apparatus receives the first condition information from the first terminal device;
   store the second condition information in the at least one memory when the communication apparatus receives the second condition information from the second terminal device;
   transmit the value of the first target data to the management system such that the first terminal device receives the value of the first target data when it is determined in the determining process corresponding to the first condition information that the value of the first target data changes; and
   transmit the value of the second target data to the management system such that the second terminal device receives the value of the second target data when it is determined in the determining process corresponding to the second condition information that the value of the second target data changes.

4. The communication apparatus according to claim 3, wherein:
   the first target data and the second target data are different from each other, and
   the first data identification information and the second data identification information are different from each other.

5. The communication apparatus according to claim 3, wherein:
   the first target data is the same as the second target data,
   the first data identification information is the same as the second data identification information, and
   the instructions, when executed by the at least one processor, cause the communication apparatus to:
   determine whether performing the determining process corresponding to the second condition information is scheduled in a predetermined time from a current time when it is determined in the determining process corresponding to the first condition information that the value of the first target data has changed,
   transmit the value of the first target data to the management system such that each of the first terminal device and the second terminal device receives the value of the first target data when it is determined that performing the determining process is scheduled, and
   transmit the value of the first target data to the management system such that the first terminal device receives the value of the first target data and the second terminal device does not receive the value of the first target data when it is determined that performing the determining process is not scheduled.

6. The communication apparatus according to claim 1, wherein—
   the instructions, when executed by the at least one processor, cause the communication apparatus to:
   receive the at least condition information from the management system, and
   store the at least one condition information in the at least one memory when the communication apparatus receives the at least one condition information from the management system.

7. The communication apparatus according to claim 1, wherein:
   the at least one condition information includes first condition information including first data identification information to identify first target data, and first time information representing a first target time,
   the management system is configured to include a relay server and a first terminal device, and
   the instructions, when executed by the at least one processor, cause the communication apparatus to:
   receive the first condition information from the first terminal device through the relay server,
   store the first condition information in the at least one memory when the communication apparatus receives the first condition information from the first terminal device through the relay server, and transmit the value of the first target data to the relay server such that the first terminal device receives the value of the first target data when it is determined in the determining process corresponding to the first condition information that the value of the first target data changes.

8. The communication apparatus according to claim 7, wherein—the instructions, when executed by the at least one processor, cause the communication apparatus to:

transmit the value of the first target data during the reception of the first condition information, to the relay server, before the first target time elapses since the first condition information is received, such that the first terminal device receives the corresponding value of the first target data.

9. The communication apparatus according to claim 7 or 8, wherein—the instructions, when executed by the at least one processor, cause the communication apparatus to:

receive the first condition information from the relay server using a connection formed between the communication apparatus and the relay server through the Internet when a state where the connection is not being formed changes to a state where the connection is being formed.

10. The communication apparatus according to claim 9, wherein— the instructions, when executed by the at least one processor, cause the communication apparatus to:

transmit a first request signal to the relay server in a state where the connection is not being formed;

receive a response signal with respect to the first request signal from the relay server, the response signal including a session ID which is used to establish the connection;

transmit a second request signal including the session ID to the relay server when the communication apparatus receives the response signal from the relay server; and establish the connection when the communication apparatus transmits the second request signal to the relay server.

11. A non-transitory computer readable recording medium storing a computer program for a communication apparatus configured to communicate with a management system, the computer program, when executed by a processor of the communication apparatus, causing the communication process to:

store at least one condition information in a memory, each of the at least one condition information representing a condition to transmit data from the communication apparatus to the management system, each of the at least one condition information including data identification information to identify target data which is an object of transmission, and time information representing a target time which is a time corresponding to a transmission timing of the target data;

perform a determining process corresponding to each of the at least one condition information stored in the memory, the determining process being performed every time the target time represented by the time information elapses, and the determining process being a process of determining whether a value of the target data represented by the data identification information changes between a previous target time and the target time;

transmit the value of the target data to the management system when it is determined in the determining process that the value of the target data changes; and not transmit the value of the target data to the management system when it is determined in the determining process that the value of the target data does not change.

\* \* \* \* \*